United States Patent
Jia et al.

(10) Patent No.: US 11,780,864 B2
(45) Date of Patent: Oct. 10, 2023

(54) RHENIUM(V) ALKYLIDYNE COMPLEXES AND METHODS OF USE AND PREPARATION THEREOF

(71) Applicant: The Hong Kong University of Science and Technology, Hong Kong (CN)

(72) Inventors: Guochen Jia, Hong Kong (CN); Mingxu Cui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 17/810,660

(22) Filed: Jul. 5, 2022

(65) Prior Publication Data

US 2023/0059662 A1    Feb. 23, 2023

Related U.S. Application Data

(60) Provisional application No. 63/218,923, filed on Jul. 7, 2021.

(51) Int. Cl.
*C07F 13/00* (2006.01)
*B01J 31/16* (2006.01)

(52) U.S. Cl.
CPC ......... *C07F 13/005* (2013.01); *B01J 31/1616* (2013.01)

(58) Field of Classification Search
CPC .................. C07F 13/00; B01J 23/36
See application file for complete search history.

(56) References Cited

U.S. PATENT DOCUMENTS

| | | | |
|---|---|---|---|
| 5,087,710 A | 2/1992 | Schrock et al. | |
| 5,146,033 A * | 9/1992 | Schrock | C07C 67/475 585/646 |
| 6,967,256 B2 | 11/2005 | Cummins et al. | |
| 7,687,635 B2 * | 3/2010 | Verpoort | C07F 15/02 556/137 |
| 8,143,429 B2 | 3/2012 | Ochiai et al. | |
| 2007/0060781 A1 * | 3/2007 | Goldman | B01J 23/36 585/708 |
| 2017/0114275 A1 * | 4/2017 | Lo | G01N 33/58 |

OTHER PUBLICATIONS

K. Lee et al., 24 Chemistry a European Journal, 9760-9764 (2018) (Year: 2018).*
M. Cui et al., 144 Journal of the American Chemical Society, 6349-6360 (Apr. 4, 2022) (Year: 2022).*
M. Cui et al., 142 Journal of the American Chemical Society, 13339-13344 (Jul. 16, 2020) (Year: 2020).*
Wei Bai, et. al., Alkyne Metathesis Reactions of Rhenium(V) Carbyne Complexes, Organometallics, Nov. 28, 2016, vol. 35 (22), p. 3808-3815.
Wei Bai, et. al., Syntheses of Re(V) Alkylidyne Complexes and Ligand Effect on the Reactivity of Re(V) Alkylidyne Complexes toward Alkynes Organometallics. Feb. 26, 2018, vol. 37 (4), p. 559-569.
Mingxu Cui, et. al., Robust Alkyne Metathesis Catalyzed by Air Stable d2 Re(V) Alkylidyne Complexes. Journal of the American Chemical Society, Aug. 5, 2020, vol. 142 (31), p. 13339-13344.

* cited by examiner

*Primary Examiner* — Alexander R Pagano
(74) *Attorney, Agent, or Firm* — S&F/WEHRW

(57) ABSTRACT

Non-$d^0$ rhenium(V) alkylidyne catalysts useful for catalyzing alkyne metathesis reactions, such as homo- and cross-metathesis of alkynes or diynes, ring closing metathesis and ring-opening metathesis, methods or use, and preparation thereof. The catalysts are stable to air and moisture and tolerate a variety of functional groups in substrates.

18 Claims, 3 Drawing Sheets

| entry | catalyst(s) | solvent | T (°C) | t (h) | yield[f] (%) |
|---|---|---|---|---|---|
| 1[a] | Re1 | toluene | 100 | 8 | trace |
| 2[a] | Re[=CCH₂(o-C₆H₄Br)]Cl₂(PMe₂Ph)₃ | toluene | 100 | 8 | trace |
| 3[b] | Re2 | neat | 100 | 8 | 21 |
| 4[b] | Re2 + CuI[e] | neat | 100 | 8 | 47 |
| 5[a] | Re2 + CuI[e] | toluene | 100 | 8 | 17 |
| 6[b] | Re3 | neat | 100 | 8 | 17 |
| 7[b] | Re3 + CuI[e] | neat | 100 | 8 | 71 |
| 8[a] | Re3 + CuI[e] | toluene | 100 | 8 | 11 |
| 9[a] | Re4 | toluene | 100 | 3 | 44 |
| 10[a] | Re4 + CuI[e] | toluene | 100 | 3 | 21 |
| 11[a] | Re4 + MnO₂[e] | toluene | 100 | 3 | 24 |
| 12[c] | Re4 | wet toluene | reflux | 16 | 73 |
| 13[d] | Re4 | dry toluene | reflux | 16 | 77 |

RHENIUM(V) ALKYLIDYNE COMPLEXES AND METHODS OF USE AND PREPARATION THEREOF

CROSS-REFERENCE TO RELATED APPLICATIONS

The present application claims priority from U.S. Provisional Patent Application No. 63/218,923, filed on Jul. 7, 2021, which is hereby incorporated by reference in its entirety.

BACKGROUND

Transition metal catalyzed alkyne metathesis reactions have been widely used in organic synthesis and material preparation. Early catalysts were heterogeneous catalytic systems involving inorganic oxides, such as $WO_3$ and $MoO_3$, loaded on silica or homogeneous catalysts based on $Mo(CO)_6$ with phenol as cocatalyst. However, these in-situ catalytic systems are of low efficiency (requiring activation at high temperatures (>150° C.)) and have very limited substrate functional group compatibility.

The past few decades have seen the development of well-defined homogeneous catalysts based on high valent $d^0$ Mo(VI), W(VI), and Re(VII) alkylidyne complexes. These catalysts have improved catalytic efficiency and broadened substrate scope. Nevertheless, since they involve $d^0$ early transition metals, these alkylidyne catalysts are usually extremely sensitive to air and moisture, which makes them difficult to prepare, use, store, and transport, which have limited their commercial use. Additionally, these catalysts are quite active and thus do not tolerate substrates with carbonyl or protic functional groups.

An ideal homogeneous alkyne metathesis catalyst should have the following features: 1) the catalyst should be stable to air and moisture to improve ease of use and storage; 2) it should be robust enough to tolerate a wide variety of functional groups; 3) it should be active enough to catalyze metathesis reactions at moderate temperatures so common solvents can be used; and 4) it can be easily prepared.

Accordingly, there is an improved for improved alkyne metathesis catalysts that exhibit at least some of the features above.

SUMMARY

The present disclosure provides non-$d^0$ Re(V) alkylidyne complexes that are stable to air, moisture and a variety of functional groups and can catalyze alkyne metathesis reactions, including alkyne homo-metathesis, cross-metathesis, ring-closing metathesis, ring-opening metathesis polymerization and other related metathesis reactions.

In a first aspect provided herein is a rhenium(V) alkylidyne complex of Formula 1:

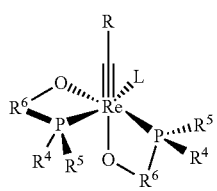

wherein L is pyridine, substituted pyridine, nitrile, or $PR^1R^2R^3$, wherein each of $R^1$, $R^2$, and $R^3$ is independently selected from the group consisting of alkyl and aryl;

R is alkyl, aryl, thiophene, or $CH_2Ar^1$, wherein AO is aryl;

each of $R^4$ and $R^5$ is independently alkyl, cycloalkyl or aryl; and $R^6$ for each instance is independently aryl.

In certain embodiments, L is pyridine, $PMePh_2$, or $PMe_2Ph$.

In certain embodiments, R is $CH_2Ar^1$, wherein $Ar^1$ is phenyl or o-bromophenyl.

In certain embodiments, each of $R^4$ and $R^5$ is independently alkyl, cycloalkyl, or phenyl optionally substituted with one or more substituents selected from alkyl, $CH_3$, $OCH_3$, F, and $CF_3$.

In certain embodiments, each of $R^4$ and $R^5$ is cyclohexyl, phenyl, 4-fluorophenyl, 2,4-difluorophenyl, 4-trifluoromethylphenyl, 2,4-bis(trifluoromethyl)phenyl, 2,4-dimethylphenyl, or 2,4-dimethoxyphenyl.

In certain embodiments, $R^6$ is phenyl optionally substituted with alkyl or trifluoromethyl.

In certain embodiments, $R^6$ is a moiety selected from the group consisting of:

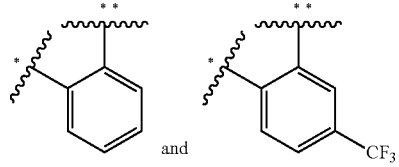

wherein * represents the site of the covalent bond to oxygen and ** represent the site of the covalent bond to phosphorous.

In certain embodiments, the rhenium(V) alkylidyne complex is selected from the group consisting of:

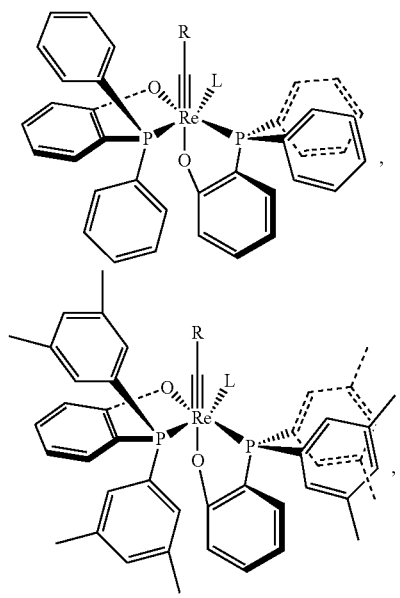

3
-continued
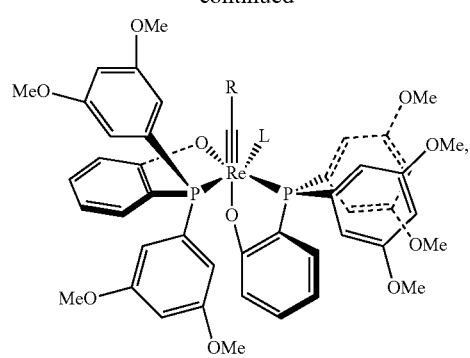
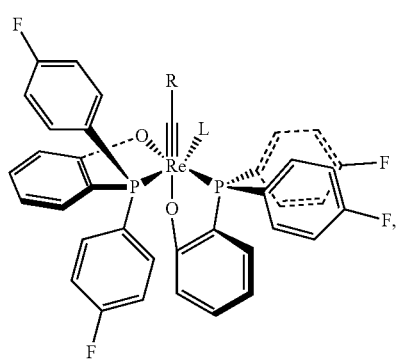
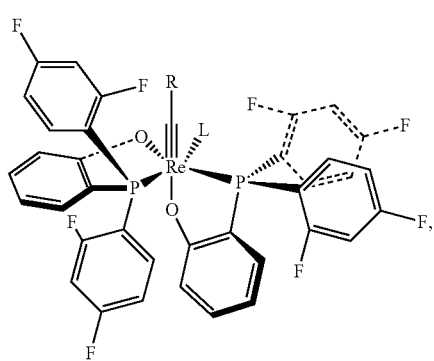
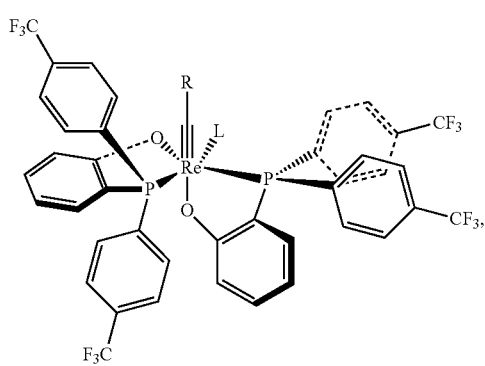
4
-continued
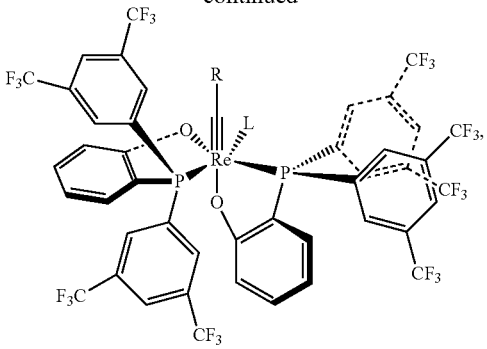
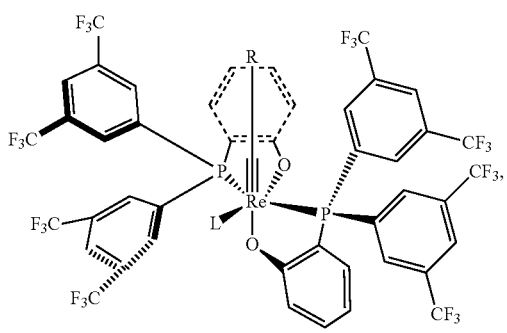
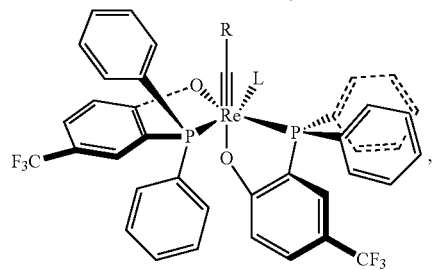
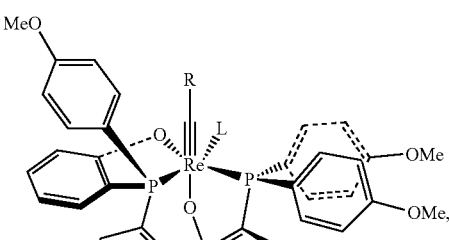
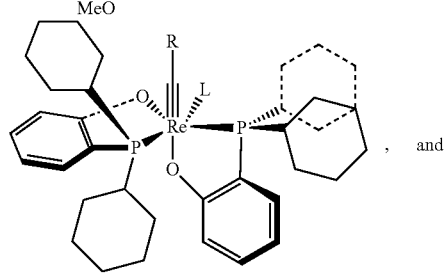
, and

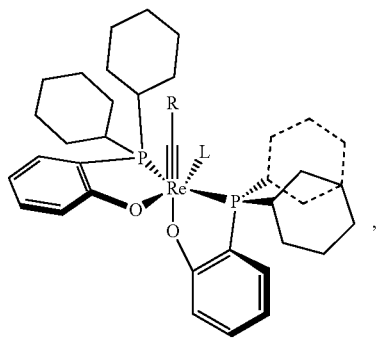

wherein R is alkyl, aryl, 2-thiophene, or CH$_2$Ar$^1$, wherein Ar$^1$ is phenyl or o-bromophenyl; and L is pyridine, 4-(trifluoromethyl)pyridine, PMePh$_2$, or PMe$_2$Ph.

In certain embodiments, R is CH$_2$Ph.

In certain embodiments, L is pyridine.

In certain embodiments, the rhenium(V) alkylidyne complex has the structure:

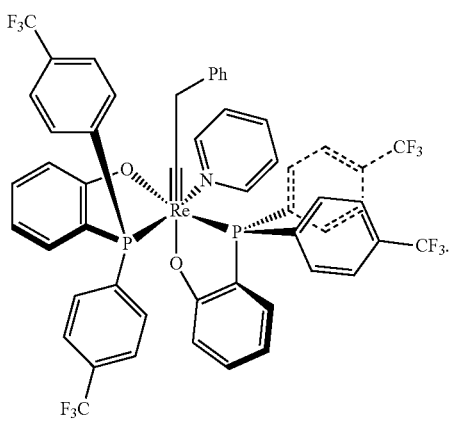

In a second aspect, provided herein is a method of preparing the rhenium (V) alkylidyne complex of the first aspect, the method comprising: contacting a compound of Formula 6:

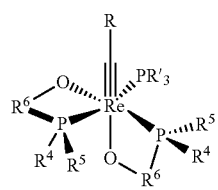

wherein R is alkyl, aryl, thiophene, or CH$_2$Ar$^1$, wherein Ar$^1$ is aryl;

PR'$_3$ is PMePh$_2$ or PMe$_2$Ph;

each of R$^4$ and R$^5$ is independently alkyl, cycloalkyl, or aryl; and

R$^6$ for each instance is independently aryl;

with a compound of Formula 7:

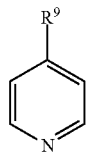

wherein R$^9$ is hydrogen or CF$_3$; and a phosphine scavenger selected from CuCl, CuI, or [(p-cymene)RuCl$_2$]$_2$; thereby forming the rhenium (V) alkylidyne complex of the first aspect.

In certain embodiments, the rhenium (V) alkylidyne complex is selected from the group consisting of:

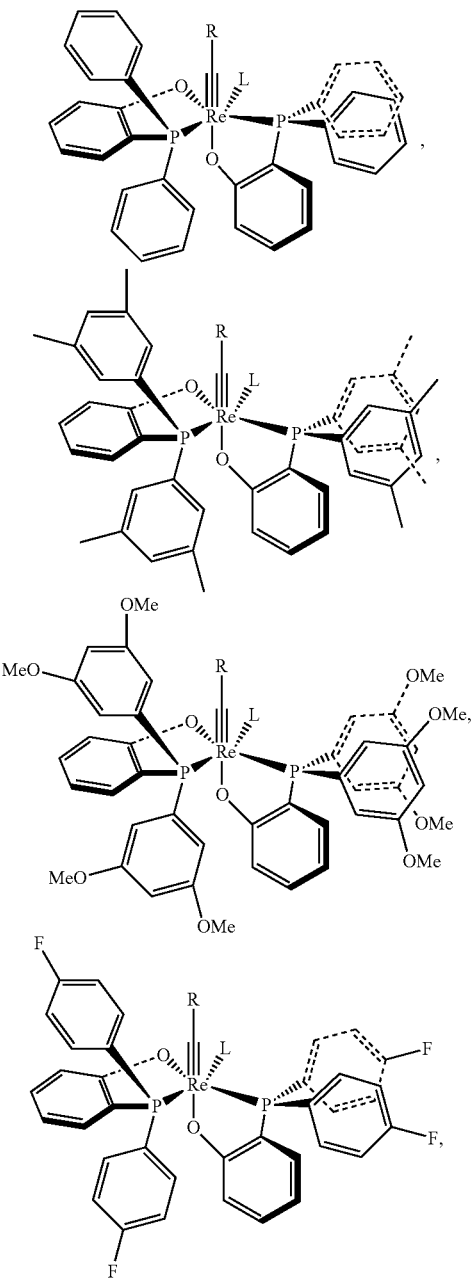

-continued

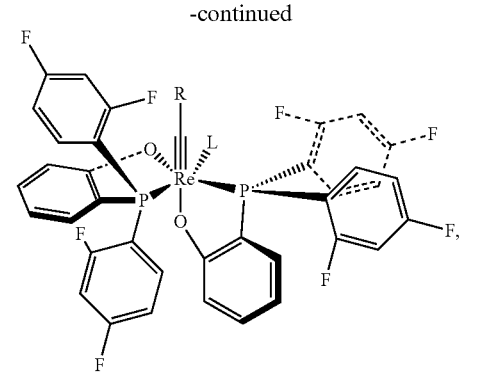

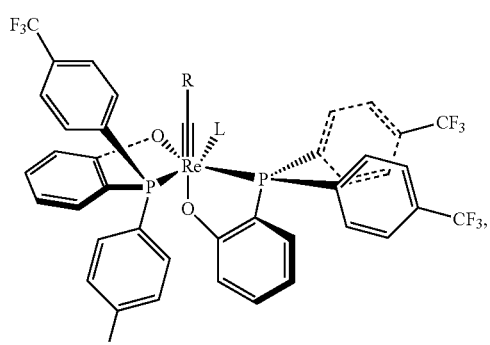

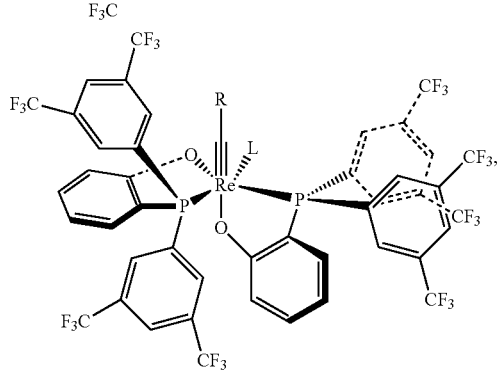

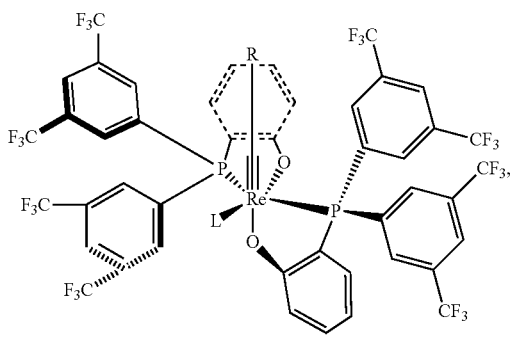

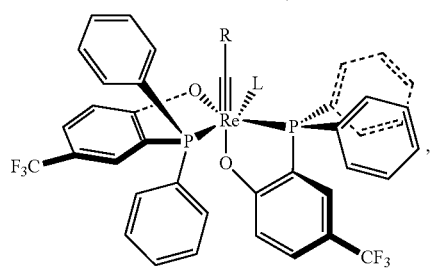

-continued

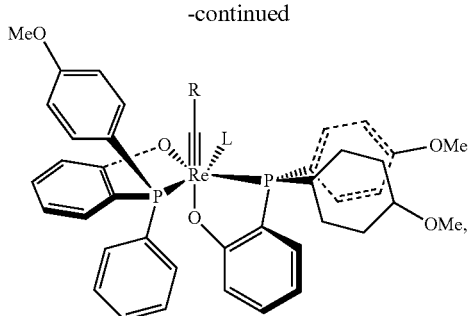

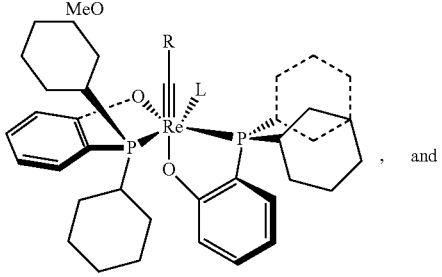

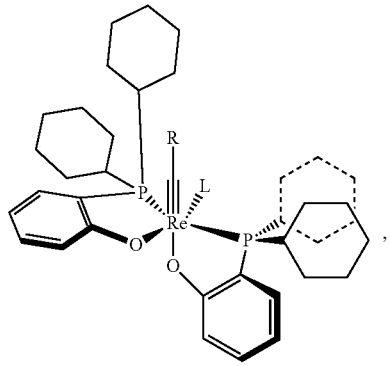

wherein R is $CH_2Ph$; and L is pyridine.

In certain embodiments, the method further comprises the step of contacting a compound of Formula 8:

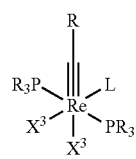

8 wherein $X^3$ is Cl; $PR_3$ is $PMePh_2$ or $PMe_2Ph$; R is alkyl, aryl, thiophene, or $CH_2Ar^1$, wherein $Ar^1$ is aryl; with a compound of Formula 9:

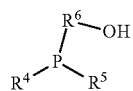

9 wherein each of $R^4$ and $R^5$ is independently alkyl, cycloalkyl, or aryl; and $R^6$ is aryl thereby forming the compound of Formula 6.

In certain embodiments, the compound of Formula 8 has the structure:

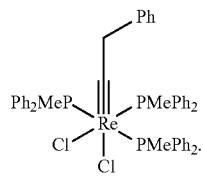

In certain embodiments, the compound of Formula 9 is selected from the group consisting of: (2-hydroxyphenyl) diphenylphosphine, 2-bis(3,5-dimethyl phenyl)phosphinophenol, 2-[bis(4-methoxy phenyl)phosphino]phenol, [2-bis(4-fluorophenyl)phosphino]phenol, (2-hydroxyphenyl)-bis(2,4-difluorophenyl)phosphine), 2-{bis[4-(trifluoromethyl)phenyl]phosphino]}phenol, 2-{bis[3,5-bis(trifluoromethyl)phenyl]phosphino}phenol, (2-hydroxy-5-trifluoromethylphenyl) diphenylphosphine, and 2-(dicyclohexylphosphino)phenol.

In a third aspect, provided herein is a method for performing a metathesis reaction, the method comprising: contacting a rhenium(V) alkylidyne complex of the first aspect with at least one alkyne substrate thereby forming an alkyne metathesis product.

In certain embodiments, the metathesis reaction is an alkyne homo-metathesis reaction, alkyne cross-metathesis, ring closing alkyne metathesis, ring opening alkyne metathesis polymerization, acyclic diyne metathesis polymerization, or acyclic diyne metathesis macrocyclization.

In certain embodiments, the alkylidyne complex is selected from the group consisting of:

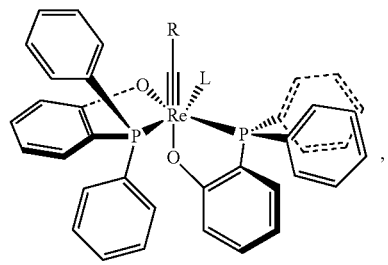

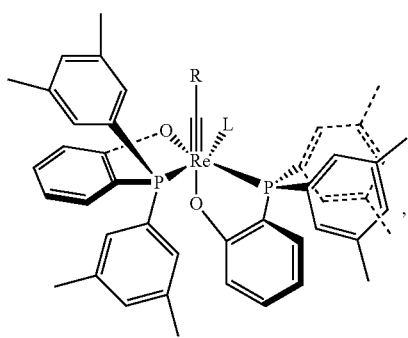

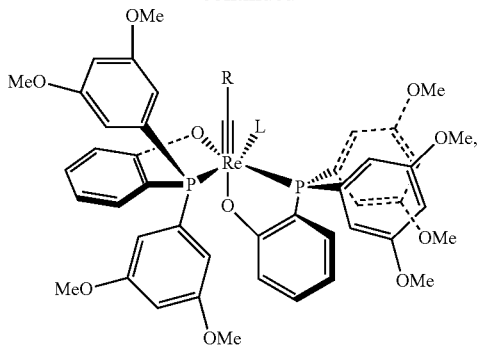

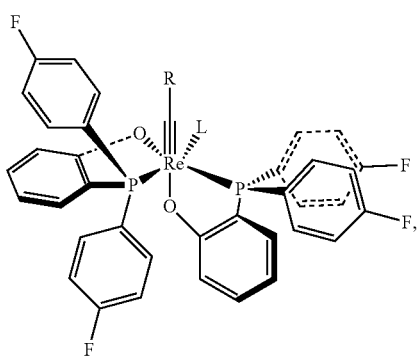

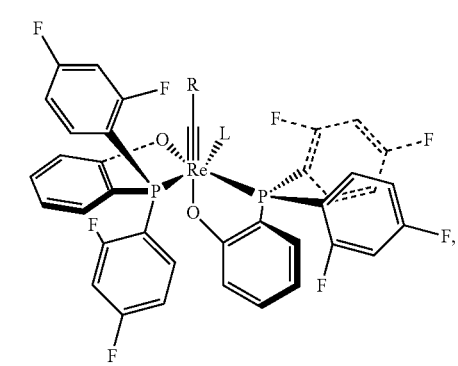

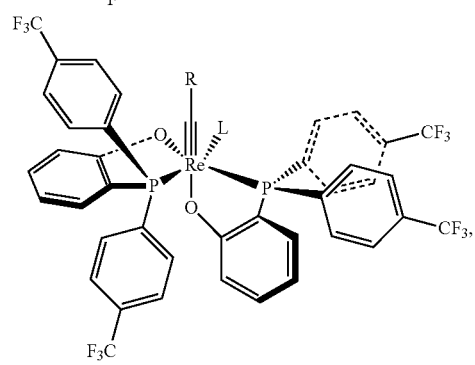

-continued

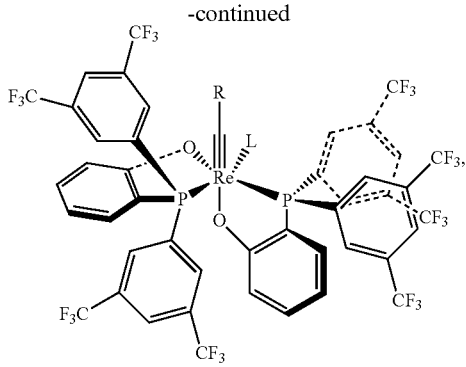

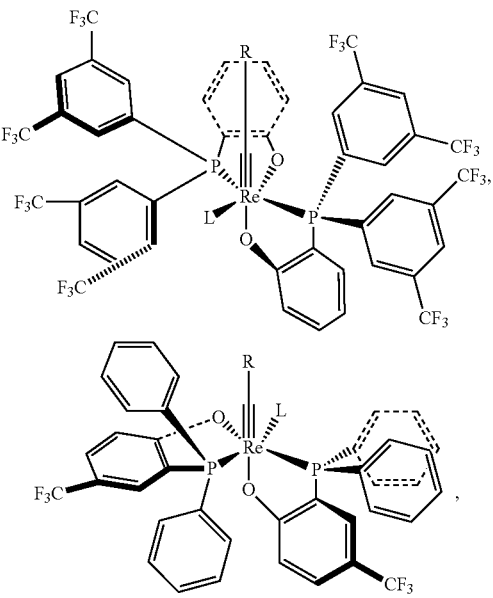

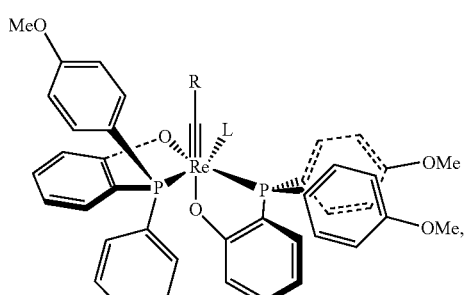

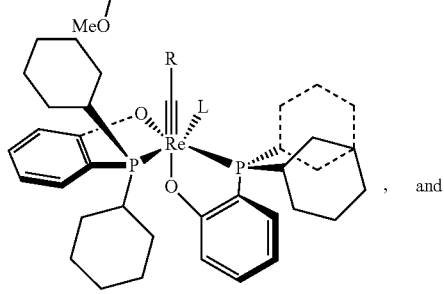, and

-continued

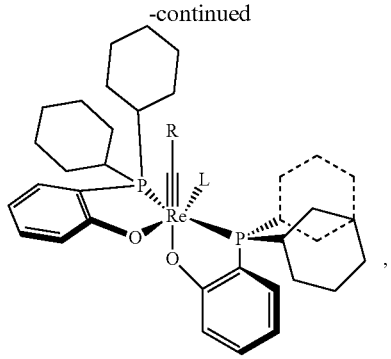

wherein R is CH$_2$Ph; and L is pyridine.

In certain embodiments, the at least one alkyne substrate is selected from the group consisting of an acyclic alkyne, a cyclic alkyne, an acyclic diyne, and a cyclic diyne.

BRIEF DESCRIPTION OF THE DRAWINGS

The above and other objects and features of the present disclosure will become apparent from the following description of the disclosure, when taken in conjunction with the accompanying drawings.

DETAILED DESCRIPTION

Figure 1:
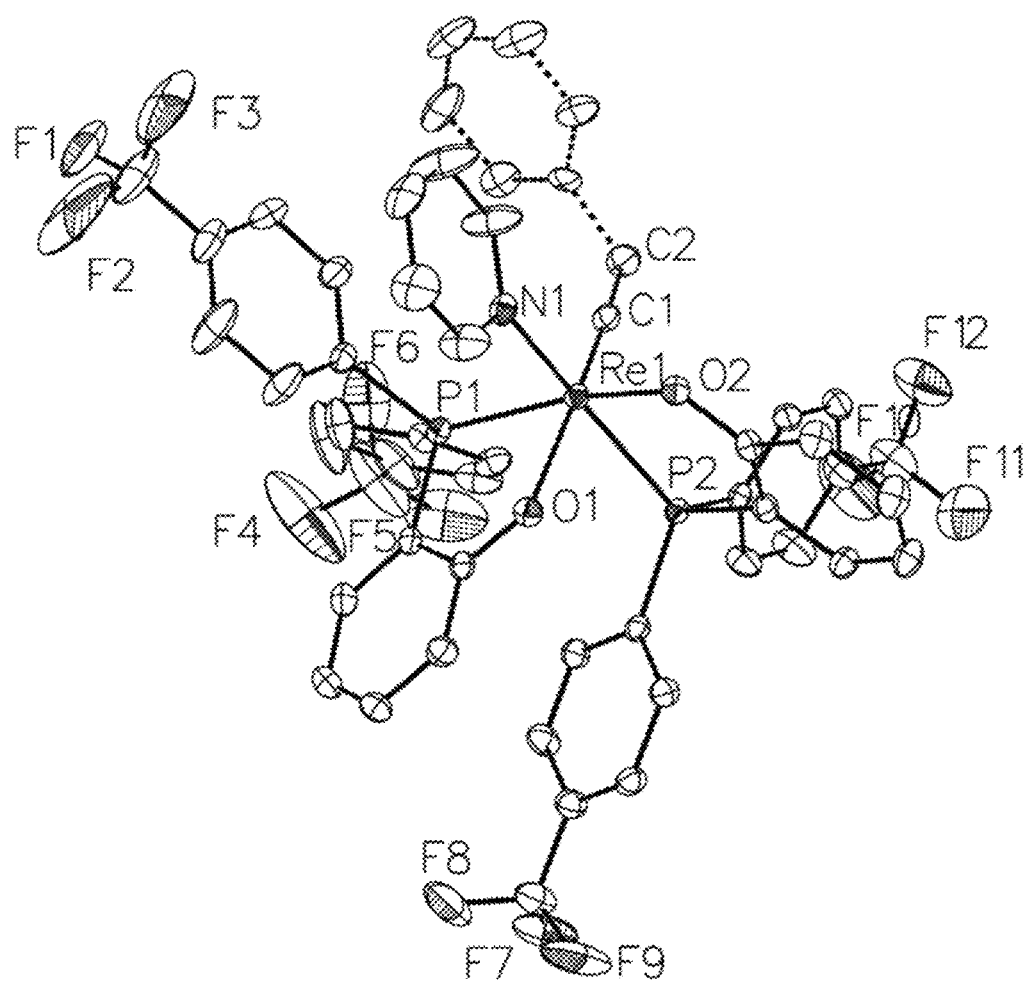
FIG. 1 depicts an Oak Ridge thermal ellipsoid plot (ORTEP) of complex 13.

The catalysts described herein are stable to air and moisture, can tolerate a variety of functional groups in substrates, and are capable of catalyzing alkyne metathesis reactions, such as homo- and cross-metathesis of alkynes or diynes, ring closing metathesis, and ring-opening metathesis.

The present disclosure provides a non-d$^0$ rhenium(V) alkylidyne complex with the general chemical structure:

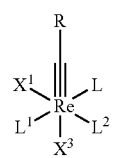

wherein R is hydrogen or a $C_1$-$C_{100}$ alkyl group, aryl group, or other hetero substituent; each of L, $L^1$, and $L^2$ is any neutral donor ligand; and each of $X^1$ and $X^2$ is any anionic ligand.

In certain embodiments, L is a labile ligand that is capable of dissociating at room temperature or under heating, such as pyridine, substituted pyridine, nitrile, or a phosphine, such as $PR^1R^2R^3$, wherein each of $R^2$, and $R^3$ is aryl, alkyl, or. Ligands $L^1$, $X^1$ and $L^2$, $X^2$ can optionally be covalently linked via an alkyl, aryl, or other organic linking motifs.

In certain embodiments, each of $L^1$ and $L^2$ is $PR^4R^5R^6$, wherein each of $R^4$ and $R^5$ is aryl, alkyl, or cycloalkyl; and $R^6$ is an aryl, alkyl, cycloalkyl, or vinyl group that is optionally be covalently linked to $X^1$ or $X^2$.

In certain embodiments, each of $X^1$ and $X^2$ is alkoxide, phenoxide with the formula $OR^6$, wherein $R^6$ is an aryl or vinyl group is optionally covalently linked to $L^1$ or $L^2$.

In certain embodiments, $R^2$ is an aryl, alkyl, cycloalkyl, or vinyl group with at least two substituents that is optionally covalently linked to $L^1$ or $L^2$ with $X^1$ or $X^2$.

In certain embodiments, the rhenium(V) alkylidyne complex has the Formula 1:

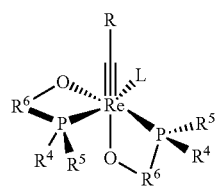

1 wherein L is pyridine, substituted pyridine, nitrile, or $PR^1R^2R^3$, wherein each of $R^1$, $R^2$, and $R^3$ is independently selected from the group consisting of alkyl and aryl;
R is alkyl, aryl, thiophene, or $CH_2Ar^1$, wherein $Ar^1$ is aryl;
each of $R^4$ and $R^5$ is independently aryl, alkyl, cycloalkyl; and
$R^6$ for each instance is independently aryl.

In certain embodiments, L is pyridine, 4-(trifluoromethyl)pyridine, nitrile, $PMePh_2$, or $PMe_2Ph$.

In certain embodiments, R is phenyl, 2-thiophene, or $CH_2Ar^1$, wherein $Ar^1$ is phenyl and o-bromophenyl.

$R^2$, and $R^3$ can be methyl or phenyl.

In certain embodiments, each of $R^4$ and $R^5$ is independently cyclohexyl or phenyl optionally substituted with one or more substituents selected from alkyl, $CH_3$, $OCH_3$, F, and $CF_3$. Each phenyl can be independently substituted with 0, 1, or 2 substituents. In certain embodiments, each of $R^4$ and $R^5$ is independently a moiety selected from the group consisting of phenyl, 4-fluorophenyl, 2,4-difluorophenyl, 4-trifluoromethylphenyl, 2,4-bis(trifluoromethyl)phenyl, 2,4-dimethylphenyl, and 2,4-dimethoxyphenyl.

In certain embodiments, $R^6$ is phenyl optionally substituted with alkyl or trifluoromethyl. In certain embodiments, $R^6$ is a moiety selected from the group consisting of:

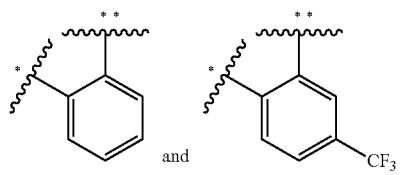 [SMILES: *c1ccccc1* ; *c1ccc(C(F)(F)F)cc1*]

wherein * represents the site of the covalent bond to oxygen and ** represent the site of the covalent bond to phosphorous.

In certain embodiments, the rhenium(V) alkylidyne complex has the Formula 2

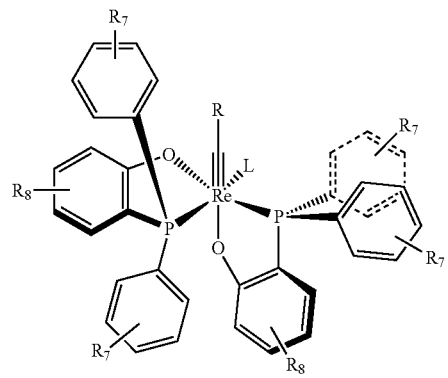

2 wherein $R^7$ is alkyl; $R^8$ is alkyl or a hetero atom-containing group selected from the group consisting of F, $CF_3$, and OMe; L is pyridine; and R is benzyl.

In certain embodiments, the rhenium(V) alkylidyne complex is selected from the group consisting of:

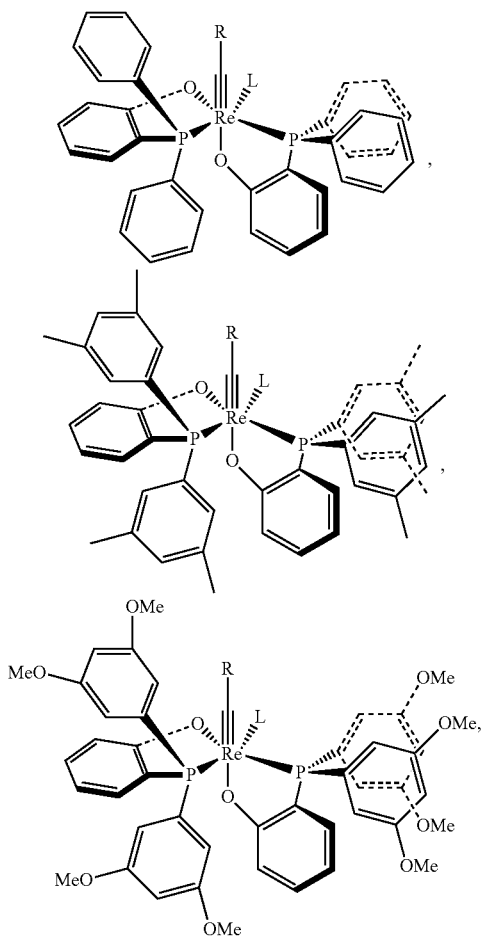

-continued
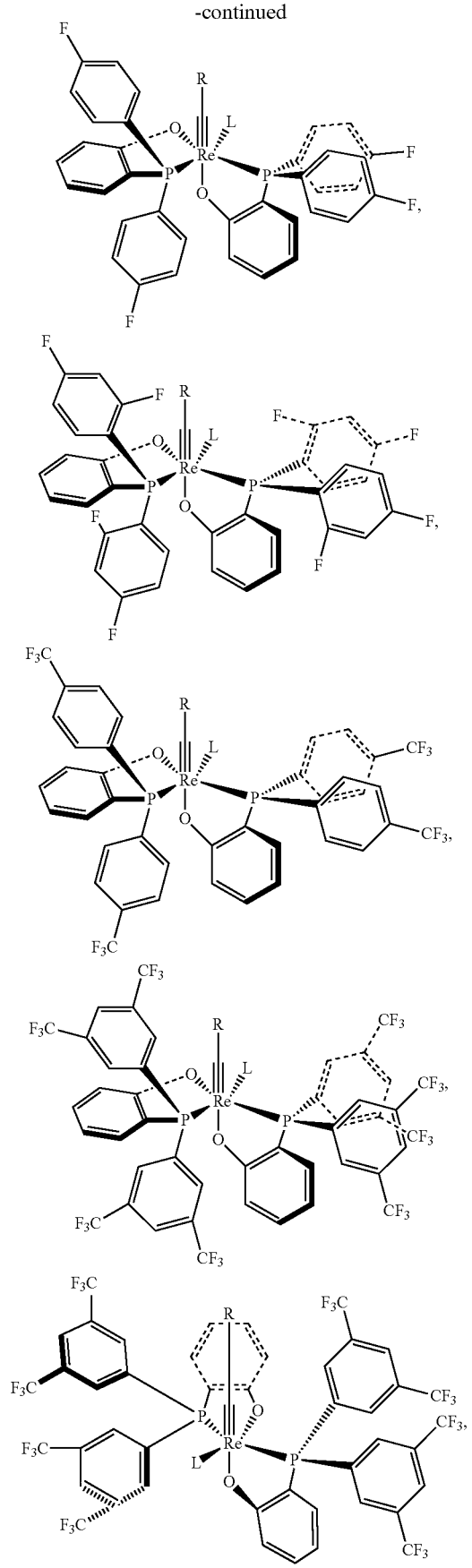
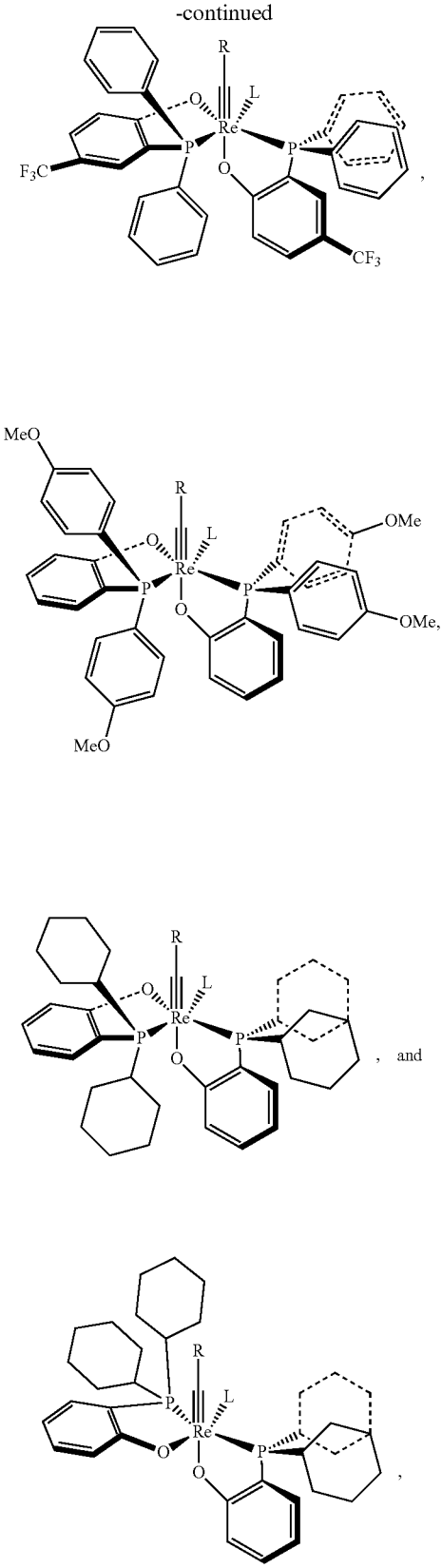
wherein R is alkyl, aryl, 2-thiophene, or $CH_2Ar^1$, wherein $Ar^1$ is phenyl or o-bromophenyl; and L is pyridine, 4-(trifluoromethyl)pyridine, $PMePh_2$, or $PMe_2Ph$.

In certain embodiments, the rhenium (V) alkylidyne complex has the structure:

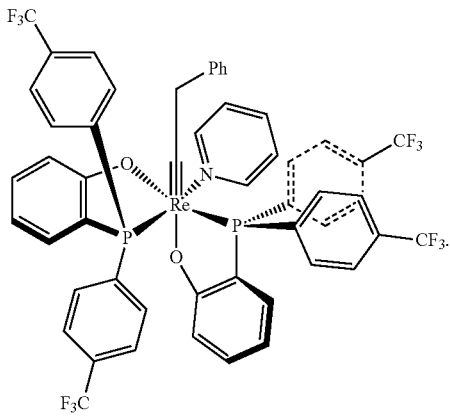

The rhenium (V) alkylidyne complexes described herein can be synthesized using methods well known to those skilled in the art. In certain embodiments, the rhenium (V) alkylidyne complexes are prepared by ligand substitution reactions of rhenium (V) alkylidyne complexes with phosphino phenols or phosphino alcohols. In certain embodiments, the rhenium (V) alkylidyne complexes described herein are prepared as illustrated in Scheme 1:

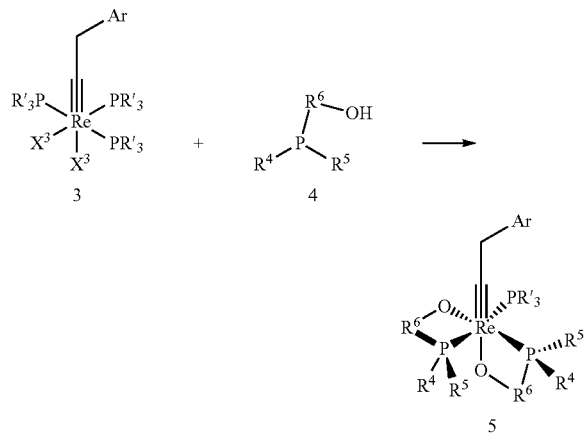

wherein $X^3$ is Cl; $PR_3$ is $PMePh_2$ or $PMe_2Ph$; and Ar is phenyl or o-bromophenyl. The rhenium (V) alkylidyne complex of Formula 6 can be prepared as described by W. Bai et al. in Organometallics 2016, 35, 3808-3815, Organometallics 2018, 37, 559-569 or G. He et al. in New J. Chem. 2013, 37, 1823-1832.

Generally, the synthesis reactions were carried out at 100° C. in toluene under $N_2$. Addition of excess (2-5 equiv.) organic base, such as triethyl amine can accelerate the transformation. Reaction will generally be finished within hours and after the reaction, insoluble salts can be removed by filtration and $PR_3$ can be removed by washing with hexane, ether, methanol or their mixtures.

The rhenium (V) alkylidyne complexes described herein can be synthesized by ligand exchange reactions of existing rhenium (V) alkylidyne complexes with a neutral electron donor ligand. For example, the reaction formula can be written as shown in Scheme 2:

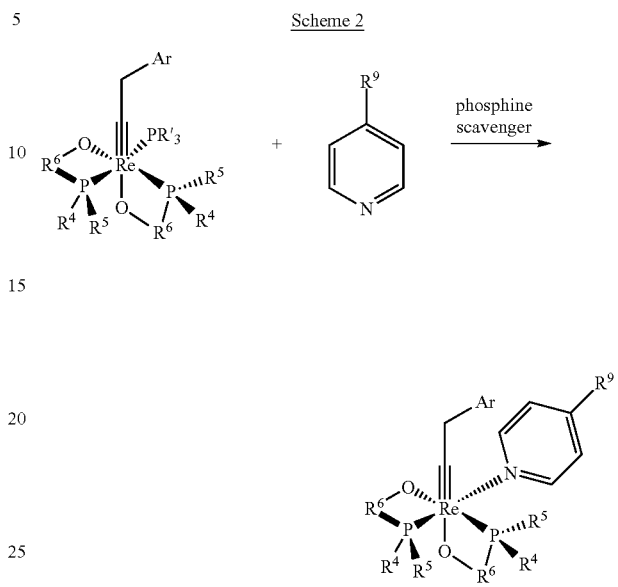

wherein $R^9$ is H or $CF_3$; and the phosphine scavenger is CuCl, CuI, or $[(p\text{-cymene})RuCl_2]_2$.

Generally, the synthesis reactions can be carried out at 80-140° C. or 100-140° C. in toluene under $N_2$. The amount of phosphine scavenger (such as a copper salt) added can be 1 equiv. The reaction can be finished within hours. Advantageously, the pyridine substituted products can be air and moisture stable in in solution. After the reaction, the byproduct copper-phosphine complexes are generated and can be removed. A practical method is to use an ammonia solution to wash the reaction mixture. Phosphines and other impurities can be removed by washing with hexane, ether, methanol or their mixtures. More particularly, the product can be purified by diethyl ether extraction followed by recrystallization from diethyl ether only when the product can well-dissolved in diethyl ether.

The present disclosure provides a method of preparing the rhenium (V) alkylidyne complex of Formula 1, the method comprising:

contacting a compound of Formula 6:

6 wherein R is alkyl, aryl, thiophene, or $CH_2Ar^1$, wherein $Ar^1$ is aryl;

$PR'_3$ is $PMePh_2$ or $PMe_2Ph$;

each of $R^4$ and $R^5$ is independently aryl, alkyl, or cycloalkyl; and $R^6$ for each instance is independently aryl;

with a compound of Formula 7:

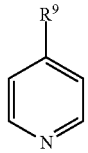

7 wherein $R^9$ is hydrogen or $CF_3$; and a phosphine scavenger selected from CuCl, CuI, or [(p-cymene)RuCl$_2$]$_2$; thereby forming the rhenium (V) alkylidyne complex of Formula 1.

In certain embodiments, R is $CH_2Ar^1$, wherein $Ar^1$ is phenyl or o-bromophenyl.

In certain embodiments, each of $R^4$ and $R^5$ is independently cyclohexyl, phenyl optionally substituted with one or more substituents selected from alkyl, $CH_3$, $OCH_3$, F, and $CF_3$. Each phenyl can be independently substituted with 0, 1, or 2 substituents. In certain embodiments, each of $R^4$ and $R^5$ is independently a moiety selected from the group consisting of phenyl, 4-fluorophenyl, 2,4-difluorophenyl, 4-trifluoromethylphenyl, 2,4-bis(trifluoromethyl)phenyl, 2,4-dimethylphenyl, and 2,4-dimethoxyphenyl.

In certain embodiments, $R^6$ is phenyl optionally substituted with alkyl or trifluoromethyl. In certain embodiments, $R^6$ is a moiety selected from the group consisting of:

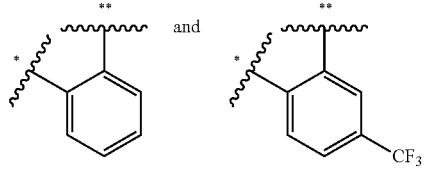 [SMILES: *c1ccccc1* ; *c1ccc(C(F)(F)F)cc1*]

wherein * represents the site of the covalent bond to oxygen and ** represent the site of the covalent bond to phosphorous.

Figure 2:
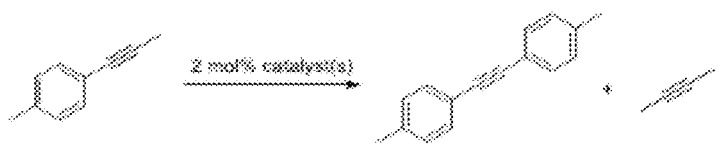
FIG. 2 depicts a table showing catalyst testing data, wherein Re1 is Re(≡CCH$_2$Ph)Cl$_2$(PMePh$_2$)$_3$, Re2 is Complex 1, Re 3 is Complex 6, and Re4 is Complex 14. [a]Condition: In a Schlenk tube filled with N$_2$, alkyne (0.2 mmol), catalyst (2 mol %), 5 Å MS (250 mg), dry toluene (2 mL). [b]Condition: In a sealed NMR tube filled with N$_2$, alkyne (0.2 mmol), catalyst (2 mol %), without 5 Å MS. [c]Condition: In a long test tube attached with an oil bubbler, alkyne (0.2 mmol), catalyst (2 mol %), wet toluene (2 mL), refluxed under N$_2$ (g). [d] Condition: In an oven-dried long test tube attached with an oil bubbler, alkyne (0.2 mmol), catalyst (2 mol %), dry toluene (2 mL), refluxed under N$_2$ (g). [e]2 mol % of an inorganic salt was added. [f]Conversions were determined by $^1$H NMR using CH$_2$Br$_2$ as the internal standard.

FIG. 2 shows a table depicting the results of homometathesis of a model alkyne using Re1 (Re(≡CCH$_2$Ph)Cl$_2$(PMePh$_2$)$_3$), Complex 1 (Re2), Complex 6 (Re3), and Complex 14 (Re4) as catalysts. The results show that the rhenium (V) alkylidyne complexes are highly active metathesis catalysts that advantageously tolerate the presence of water and can even be used neat (i.e., with the alkyne substrate(s) as solvent).

Figure 3:
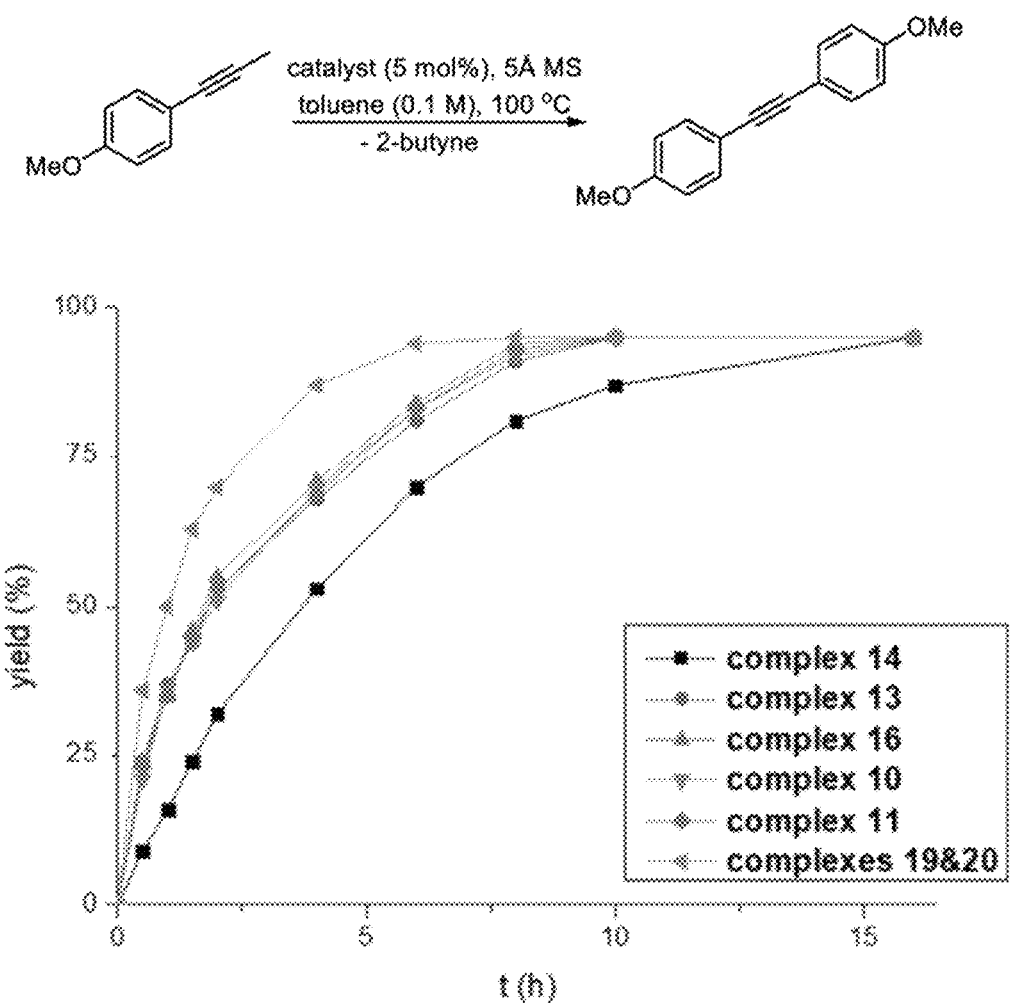
FIG. 3 depicts a graph showing relative activity of exemplary catalysts (Complexes 10, 11, 13, 14, 16, 19 and 20) toward alkyne homometathesis. [a]Condition: In a Schlenk tube filled with N$_2$, alkyne (0.3 mmol), catalyst (5 mol %), 5 Å MS (450 mg), dry toluene (3 mL). Conversions were determined by $^1$H NMR using CH$_2$Ph$_2$ as an internal standard.

FIG. 3 shows a graph depicting the yield of a homometathesis reaction of a model alkyne as a function of time for Complex 10, 11, 13, 14, 16, and 19+20. Advantageously, rhenium (V) alkylidyne complexes with more electron rich phosphine ligands, such as the dicyclohexyl phosphines of Complexes 19+20, exhibit improved homometathesis reaction rates.

The method of preparing the rhenium (V) alkylidyne complex of Formula 1 can further comprise the step of contacting a compound of Formula 8:

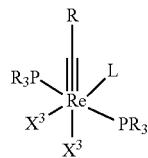

8 wherein $X^3$ is Cl; $PR_3$ is PMePh$_2$ or PMe$_2$Ph; R is alkyl, aryl, thiophene, or $CH_2Ar^1$, wherein $Ar^1$ is aryl; with a compound of Formula 9:

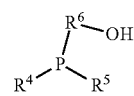

9 wherein each of $R^4$ and $R^5$ is independently alkyl, cycloalkyl, or aryl; and $R^6$ is aryl thereby forming the compound of Formula 6.

In alternative embodiments, the rhenium (V) alkylidyne complexes described herein can also be synthesized by cross metathesis using terminal or internal alkynes of existing rhenium (V) alkylidyne complexes with a neutral electron donor ligand. For example, the reaction can be illustrated as shown in Scheme 3:

Scheme 3

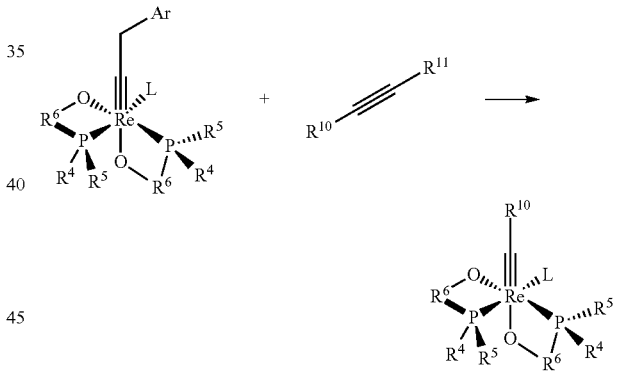

wherein $R^{10}$ can be alkyl, aryl, or other hetero substituents; $R^{11}$ can be H or alkyl; and L can be a labile neutral electron donor ligand, such as pyridine, 4-(trifluoromethyl)pyridine, PMePh$_2$ or PMe$_2$Ph.

Generally, the synthesis reactions can be carried out at 25-100° C. in solvents, such as toluene, DCE etc. under N$_2$. The alkyne can be stoichiometric or present in excess relative to the catalyst. After the reaction, organic byproducts are removed by washing with a solvent, such as hexane, diethyl ether or methanol.

The rhenium(V) alkylidyne complexes described herein are highly active toward alkyne metathesis reactions. They can catalyze a variety of alkyne metathesis reactions, alkyne homo-metathesis, alkyne cross-metathesis (ACM), ring closing alkyne metathesis (RCAM), ring opening alkyne metathesis polymerization (ROAMP), acyclic diyne metathesis polymerization (ADIMET), acyclic diyne metathesis macrocyclization (ADIMAC) and so on.

Also provided herein is a method for performing a metathesis reaction, the method comprising: contacting a rhenium(V) alkylidyne complex described herein with at least one alkyne substrate thereby forming an alkyne metathesis product.

The rhenium(V) alkylidyne complex and the at least on alkyne can be contacted in any stoichiometry. In certain embodiments, the rhenium(V) alkylidyne complex is present in a catalytic amount relative to the at least one alkyne. In certain embodiments, the rhenium(V) alkylidyne complex is present at 1-10 mol %, 1-5 mol %, or 2-3 mol % relative to the at least one alkyne.

The step of contacting the rhenium(V) alkylidyne complex with the at least one alkyne can take place at temperature between room temperature to 110° C., 80° C. to 110° C. or 100 to 110° C. The reaction of the rhenium(V) alkylidyne complex with the at least one alkyne can be allowed to proceed between 3-24, hours 8-16 hours, or 12-24 hours.

In certain embodiments, the alkyne metathesis reaction is an alkyne homo-metathesis reaction, ACM reaction, RCAM reaction, ROAMP reaction, ADIMET reaction, or acyclic diyne ADIMAC reaction.

In certain embodiments, the at least on alkyne substrate is one or two alkyne substrates. In certain embodiments, the alkyne substrate is one or more alkyne substrates selected from the group consisting of an acyclic alkyne, a cyclic alkyne, an acyclic diyne, and a cyclic diyne.

Since the rhenium(V) alkylidyne complexes described herein are stable in the presence of various functional groups, they may be used to catalyze the metathesis of a wide variety of alkynes under a wide variety of conditions. For example the at least one alkyne substrate can optionally include one or more functional groups selected from the group consisting of ketone, aldehyde, ester, thioester, cyano, cyanato, epoxy, silyl, silyloxy, silanyl, siloxazanyl, boronato, boryl, stannyl, disulfide, carbonate, imine, carboxyl, amine, amide, carboxyl, isocyanate, thioisocyanate, carbodiimide, ether, thioether, nitro, nitroso, halogen, ammonium, phosphonate, phosphoryl, phosphino, phosphanyl, sulfanyl, sulfonyl, sulfinyl, sulfonamide, and sulfonate. In certain embodiments, the at least one alkyne substrate can optionally include one or more functional groups selected from the group consisting of halides (e.g., chloride and fluoride), alkoxy, benzyloxy, propargyl, ketone, amine, alcohol, aldehyde, ester, and carboxylic acid.

The alkyne substrates can include one or more substituents selected from the group consisting of hydrogen, alkyl, alkenyl, cycloalkyl, cycloalkenyl, heterocycloalkyl, aryl, and heteroaryl,

EXAMPLES

General Considerations. All manipulations were carried out under a nitrogen atmosphere using standard Schlenk techniques unless otherwise stated. Solvents were distilled under nitrogen over a drying agents indicated and either used freshly or stored over 3 Å or 4 Å MS in a sealed tube: hexane, pentane, cyclohexane, diethyl ether, THF and 1,4-dioxane (sodium benzophenone); toluene and benzene-$d_6$ (sodium); dichloromethane, dichloroethane, acetonitrile and chloroform-d (CaH$_2$); methanol (sodium methanolate), isobutanol (sodium iso-butoxide). $^1$H, $^{13}$C{$^1$H}, $^{19}$F{$^1$H} and $^{31}$P{$^1$H} NMR spectra were collected on a Bruker-400 spectrometer (400 MHz). $^1$H and $^{13}$C{$^1$H} NMR shifts are reported in ppm with the solvent peaks as an internal standard (CDCl$_3$: δ H at 7.26 ppm, δ C at 77.16 ppm; C$_6$D$_6$: δ H at 7.16 ppm, δ C at 128.06 ppm; CD$_3$CN: δ H at 1.94 ppm, δ C at 29.84 ppm for CD$_3$). Coupling constants, J, are reported in hertz (Hz). HRMS were recorded by using a chemical ionization (CI) mass spectrometer. Elemental analysis was performed by M-H-W Laboratories (Phoenix, Ariz., USA) or MEDAC Ltd (Chobham, U.K.).

Example 1—Synthesis of Re(≡CCH$_2$Ph)($^{Ph}$PO)$_2$ (PMePh$_2$) (Complex 1)

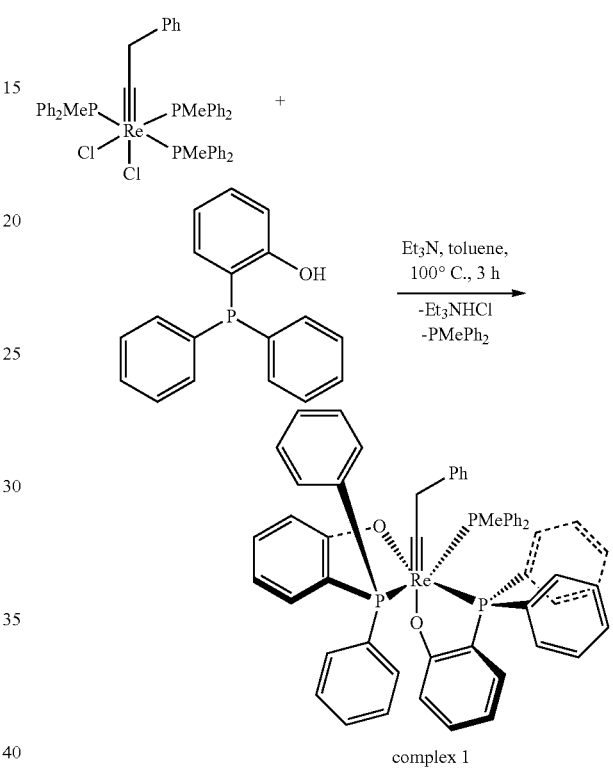

complex 1

A mixture of Re(≡CCH$_2$Ph)Cl$_2$(PMePh$_2$)$_3$ (275 mg, 0.29 mmol), (2-hydroxyphenyl) diphenylphosphine (167 mg, 0.6 mmol) and Et$_3$N (174 mg, ca. 0.24 mL, 1.7 mmol) in 15 mL of toluene was heated at 100° C. for 3 hours. After cooling down to room temperature, the solution was filtered to remove triethylamine hydrochloride. The filtrate was evaporated under vacuum to give an orange residue. The residue was washed with methanol (5 mL×3) to give a yellow solid. Yield: 260 mg, 87%.

$^1$H NMR (400 MHz, CDCl$_3$): δ 7.36–7.23 (m, 5H), 7.21–7.10 (m, 15H), 7.05–6.90 (m, 14H), 6.84–6.76 (m, 5H), 6.59–6.42 (m, 4H), 2.80 (dq, J=19.8, 3.2 Hz, 1H, ReCCH$_2$Ph), 2.56 (dq, J=19.6, 1.8 Hz, 1H, ReCCH$_2$Ph), 1.31 (d, J=8.5 Hz, 3H, PMePh$_2$). $^{13}$C{$^1$H} NMR (101 MHz, CDCl$_3$): δ 276.4–273.9 (m, ReC), 180.3 (d, J=8.7 Hz, ReOC), 180.0 (d, J=8.6 Hz, ReOC), 144.1 (s), 143.6 (s), 142.4 (s), 141.9 (s), 135.9–131.9 (m), 131.8 (s), 129.1–128.8 (m), 128.7 (s), 128.4 (s), 128.1–127.0 (m), 126.3 (s), 121.6 (d, J=5.2 Hz), 120.6 (d, J=7.7 Hz), 119.2 (s), 118.7 (s), 118.0 (s), 117.5 (s), 115.8 (d, J=6.3 Hz), 114.4 (d, J=4.5 Hz), 54.8 (s, ReCCH$_2$Ph), 12.3 (d, J=30.4 Hz, PMePh$_2$). $^{31}$P{$^1$H} NMR (162 MHz, CDCl$_3$): δ 37.3 (s, 1P), 27.0 (d, J=220.3 Hz, 1P), 3.4 (d, J=224.0 Hz, 1P). Anal. Calcd for C$_{57}$H$_{48}$O$_2$P$_3$Re: C, 65.57; H, 4.63. Found: C, 65.41; H, 4.53.

Example 2—Synthesis of Re(≡CCH₂Ph)(^XylPO)₂(PMePh₂) (Complex 2)

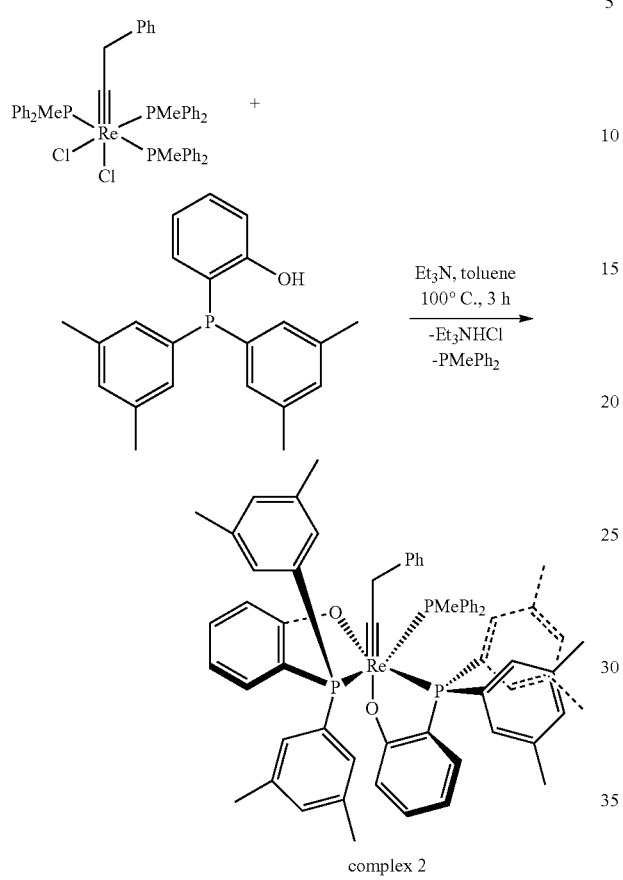

complex 2

A mixture of Re(≡CCH₂Ph)Cl₂(PMePh₂)₃ (192 mg, 0.2 mmol), 2-bis(3,5-dimethyl phenyl)phosphinophenol (140 mg, 0.42 mmol) and Et₃N (101 mg, ca. 0.14 mL, 1 mmol) in 7 mL of toluene was heated at 100° C. for 3 hours. After cooling down to room temperature, the solution was filtered to remove triethylamine hydrochloride salts. The filtrate was evaporated under vacuum to give an orange oily residue. The residue was washed with degassed MeOH (2 mL×3) and ACN (3 mL×3) to give a yellow solid. Yield: 155 mg, 67%.

¹H NMR (400 MHz, CDCl₃) δ 7.39–6.87 (m, 20H), 6.87–6.57 (m, 11H), 6.48–6.30 (m, 4H), 2.99 (dq, J=19.3, 3.2 Hz, 1H, ReCCH₂Ph), 2.76 (dq, J=19.8, 3.2 Hz, 1H, ReCCH₂Ph), 1.96 (s, 6H), 1.88 (s, 18H), 1.28 (d, J=8.0 Hz, 3H, PMePh₂). ¹³C{¹H} NMR (101 MHz, CDCl₃) δ 273.83 (q, J=12.5 Hz, ReC), 179.85 (dd, J=23.2, 8.7 Hz), 174.91 (d, J=22.7 Hz), 144.12–142.70 (m), 137.51–134.70 (m), 133.53 (s), 132.83 (dd, J=9.4, 3.8 Hz), 132.53 (s), 132.11–131.08 (m), 131.03–129.66 (m), 128.96–128.36 (m), 127.29 (dd, J=11.7, 9.3 Hz), 126.21 (s), 121.79 (d, J=6.9 Hz), 120.31 (d, J=4.4 Hz), 119.78 (s), 119.32 (s), 118.80 (s), 115.36 (d, J=6.2 Hz), 113.76 (d, J=6.1 Hz), 54.56 (s, ReCCH₂Ph), 21.52 (s), 21.19 (s), 21.16 (s), 21.11 (s), 12.22 (d, J=30.7 Hz, PMePh₂). ³¹P{¹H} NMR (162 MHz, CDCl₃): δ 36.0 (s), 28.1 (d, J=228.4 Hz), 3.3 (d, J=228.4 Hz). Anal. Calcd for C₆₅H₆₄O₂P₃Re: C, 67.52; H, 5.58. Found: C, 67.39; H, 5.38.

Example 3—Synthesis of Re(≡CCH₂Ph)(^4-MeO-PhPO)₂(PMePh₂) (Complex 3)

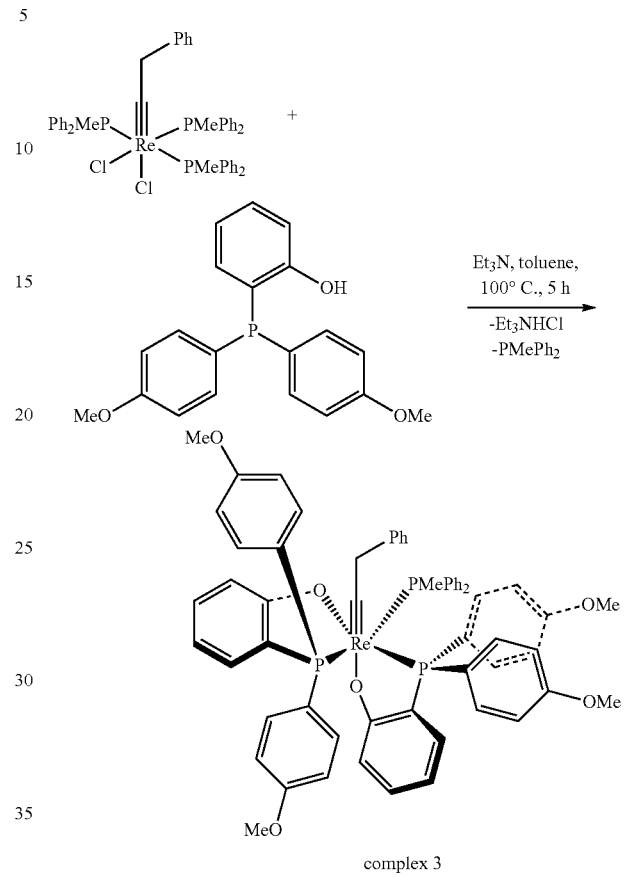

complex 3

A mixture of Re(≡CCH₂Ph)Cl₂(PMePh₂)₃ (275 mg, 0.29 mmol), 2-[bis(4-methoxy phenyl)phosphino]phenol (200 mg, 0.60 mmol) and Et₃N (146 mg, ca. 0.2 mL, 1.45 mmol) in 10 mL of toluene was heated at 110° C. for 5 hours. After cooling down to room temperature, the solution was filtered to remove triethylamine hydrochloride. The filtrate was concentrated to ca. 1 mL under vacuum. Addition of 10 mL hexane to the mixture leaded the precipitation of a pale yellow solid, which was filtered off and washed with hexane (5 mL×2) and mixture of hexane and diethyl ether (v/v=1:1, 5 mL×3) to give a pale yellow solid. Yield: 225 mg, 67%. The single crystal of complex 3 suitable for X-ray diffraction analysis was obtained by slow evaporation of its CDCl₃ solution.

¹H NMR (400 MHz, CDCl₃) δ 7.47–6.74 (m, 27H), 6.45 (m, 12H), 3.79 (s, 3H, OMe), 3.77 (s, 3H, OMe), 3.72 (s, 3H, OMe), 3.68 (s, 3H, OMe), 2.92 (d, J=19.7 Hz, 1H, ReCCH₂Ph), 2.77 (d, J=19.7 Hz, 1H, ReCCH₂Ph), 1.44 (d, J=8.2 Hz, 3H, PMePh₂). ¹³C{¹H} NMR (101 MHz, CDCl₃) δ 273.7–273.4 (m, ReC), 180.16 (d, J=8.6 Hz), 179.9 (d, J=8.3 Hz), 174.7, 174.4, 160.4–159.9 (m), 136.1–135.3 (m), 135.2 (d, J=12.3 Hz), 134.9 (d, J=11.6 Hz), 134.6, 134.3, 134.0–133.5 (m), 132.9 (d, J=9.1 Hz), 132.7 (d, J=9.9 Hz), 132.2 (s), 131.8 (s), 131.4 (s), 128.7 (s), 128.5 (s), 127.8–127.1 (m), 126.3 (s), 121.8–119.8 (m), 119.2, 118.6, 115.5 (d, J=6.2 Hz), 113.9 (d, J=5.2 Hz), 113.5–112.5 (m), 55.3 (s, OMe), 55.2 (s, OMe), 55.2 (s, OMe), 55.2 (s, OMe), 54.9 (s, ReCCH₂Ph), 12.1 (d, J=30.2 Hz, PMePh₂). ³¹P{¹H} NMR (162 MHz, CDCl$_3$) δ 34.55 (s), 27.37 (d, J=226.9 Hz), 3.84 (d, J=227.1 Hz). Anal. Calcd for C$_{61}$H$_{56}$O$_6$P$_3$Re: C, 62.93; H, 4.85. Found: C, 63.09; H, 5.06.

Example 4—Synthesis of Re(≡CCH$_2$Ph)($^{4-F-Ph}$PO)$_2$(PMePh$_2$) (Complex 4)

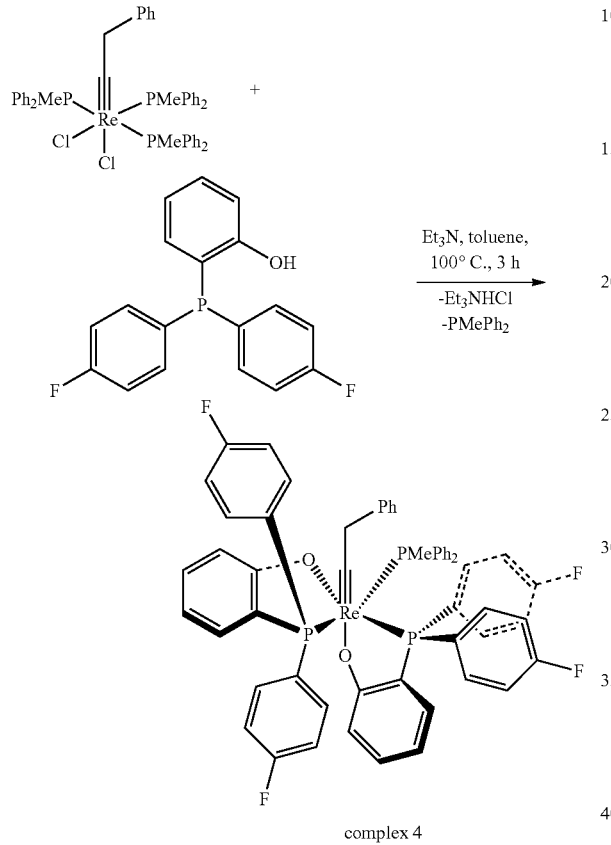

complex 4

A mixture of Re(≡CCH$_2$Ph)Cl$_2$(PMePh$_2$)$_3$ (106 mg, 0.11 mmol), [2-bis(4-fluorophenyl)phosphino]phenol (73 mg, 0.23 mmol) and Et$_3$N (117 mg, ca. 0.17 mL, 1.16 mmol) in 10 mL of toluene was heated at 100° C. for 3 hours. After cooling down to room temperature, the solution was filtered to remove triethylamine hydrochloride. The filtrate was evaporated under vacuum to give an orange oily residue. The residue was washed with acetonitrile (3 mL×3) to give a yellow solid. Yield: 74 mg, 60%.

$^1$H NMR (400 MHz, CDCl$_3$): δ 7.38-7.04 (m, 21H), 6.98-6.84 (m, 5H), 6.75-6.62 (m, 7H), 6.56-6.46 (m, 5H), 6.33-6.30 (m, 1H), 2.88 (dq, J=20.0, 3.0 Hz, 1H, ReCCH$_2$Ph), 2.67 (dq, J=20.0, 2.9 Hz, 1H, ReCCH$_2$Ph), 1.45 (d, J=8.6 Hz, 3H, PMePh$_2$). $^{13}$C{$^1$H} NMR (101 MHz, CDCl$_3$): δ 274.3 (q, J=13.9 Hz, ReC), 180.2 (d, J=8.5 Hz), 180.0 (d, J=7.6 Hz), 174.7 (d, J=23.7 Hz), 165.0-164.5 (m), 162.5-162.0 (m), 139.7 (d, J=53.2 Hz), 137.9 (d, J=53.3 Hz), 135.5-134.0 (m), 133.2 (s), 132.8-132.5 (m), 132.2 (s), 131.7 (s), 131.4 (d, J=3.4 Hz), 130.9 (d, J=3.1 Hz), 129.1 (d, J=18.1 Hz), 128.6 (d, J=15.5 Hz), 127.6 (dd, J=27.6, 9.5 Hz), 126.6 (s), 125.7 (d, J=44.0 Hz), 121.9 (d, J=7.0 Hz), 120.8 (d, J=10.0 Hz), 118.8 (d, J=53.2 Hz), 117.4 (d, J=53.3 Hz), 116.1 (d, J=6.5 Hz), 115.3-114.4 (m), 54.8 (ReCCH$_2$Ph), 11.9 (d, J=30.6 Hz, PMePh$_2$). $^{19}$F{$^1$H} NMR (376.5 MHz, CDCl$_3$): δ −110.9 (m, 1F), −111.2 (m, 1F), −111.5 (m, 1F), −111.9 (m, 1F). $^{31}$P{$^1$H} NMR (162 MHz, CDCl$_3$): δ 36.8 (s, 1P), 28.1 (d, J=226.5, 1P), 3.5 (d, J=225.7 Hz, 1P). Anal. Calcd for C$_{57}$H$_{44}$F$_4$O$_2$P$_3$Re: C, 61.34; H, 3.97. Found: C, 61.27; H, 4.00.

Example 5—Synthesis of Re(≡CCH$_2$Ph)($^{2,4-F2-Ph}$PO)$_2$(PMePh$_2$) (Complex 5)

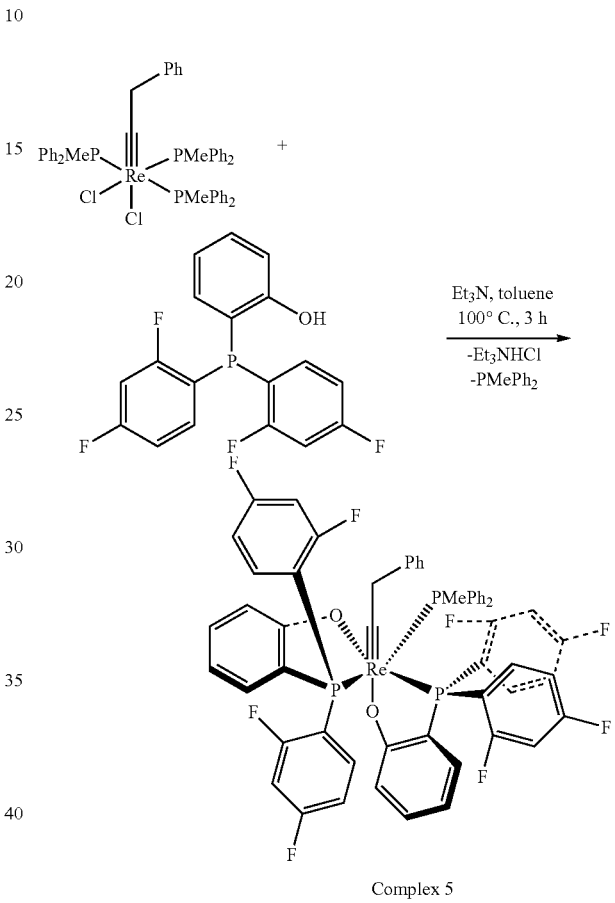

Complex 5

A mixture of Re(≡CCH$_2$Ph)Cl$_2$(PMePh$_2$)$_3$ (293 mg, 0.3 mmol), (2-hydroxyphenyl)-bis(2,4-difluorophenyl)phosphine (224 mg, 0.64 mmol) and Et$_3$N (152 mg, ca. 0.21 mL, 1.5 mmol) in 10 mL of toluene was heated at 100° C. for 3 hours. After cooling down to room temperature, the solution was filtered to remove triethylamine hydrochloride. The filtrate was evaporated under vacuum to give an orange oily residue. The residue was washed with hexane (5 mL×3) and degassed methanol (5 mL×3) to give an orange solid. Yield: 249 mg, 70%.

$^1$H NMR (400 MHz, CDCl$_3$) δ 8.17 (dd, J=15.7, 7.9 Hz, 1H), 7.50-7.02 (m, 18H), 6.97-6.87 (m, 1H), 6.86-6.67 (m, 5H), 6.66-6.57 (m, 2H), 6.55-6.37 (m, 4H), 6.18 (t, J=9.5 Hz, 1H), 6.11 (t, J=8.0 Hz, 1H), 5.93 (dd, J=12.6, 6.0 Hz, 1H), 5.86-5.78 (m, 1H), 3.40-3.16 (m, 2H), 1.57 (d, J=8.4 Hz, 3H). $^{13}$C{$^1$H} NMR (101 MHz, CDCl$_3$) δ 277.1-275.8 (m), 179.8 (dd, J=25.7, 8.4 Hz), 173.0 (d, J=25.6 Hz), 166.6-161.2 (m), 142.3 (d, J=22.6 Hz), 137.2-131.4 (m), 129.6-128.6 (m), 127.6 (m), 127.0 (dd, J=11.6, 9.7 Hz), 126.8 (s), 126.2 (d, J=21.2 Hz), 125.7 (d, J=20.8 Hz), 122.8 (d, J=18.0 Hz), 122.2 (d, J=14.8 Hz), 121.2 (d, J=7.3 Hz), 120.8 (d, J=7.6 Hz), 118.9 (s), 118.4 (s), 117.1-116.2 (m), 115.1 (d,

J=6.5 Hz), 114.6 (s), 112.5–109.3 (m), 105.4–102.6 (m), 55.8 (s), 11.4 (d, J=32.6 Hz). $^{19}$F {$^1$H} NMR (376 MHz, CDCl$_3$) δ −88.60 (br, 1F), −93.59—−95.04 (m, 2F), −99.65 (s, 1F), −105.64 (dt, J=16.3, 8.0 Hz, 1F), −106.70—−107.22 (m, 1F), −107.81 (s, 1F), −108.83—−109.36 (m, 1F). $^{31}$P{$^1$H} NMR (162 MHz, CDCl$_3$) δ 33.72 (s), 21.00 (d, J=238.2 Hz), 4.10 (d, J=233.0 Hz). Anal. Calcd for C$_{57}$H$_{40}$F$_8$O$_2$P$_3$Re: C, 57.63; H, 3.39. Found: C, 57.79; H, 3.40.

Example 6—Synthesis of Re(≡CCH$_2$Ph)($^{4\text{-}CF3\text{-}Ph}$PO)$_2$(PMePh$_2$) (Complex 6)

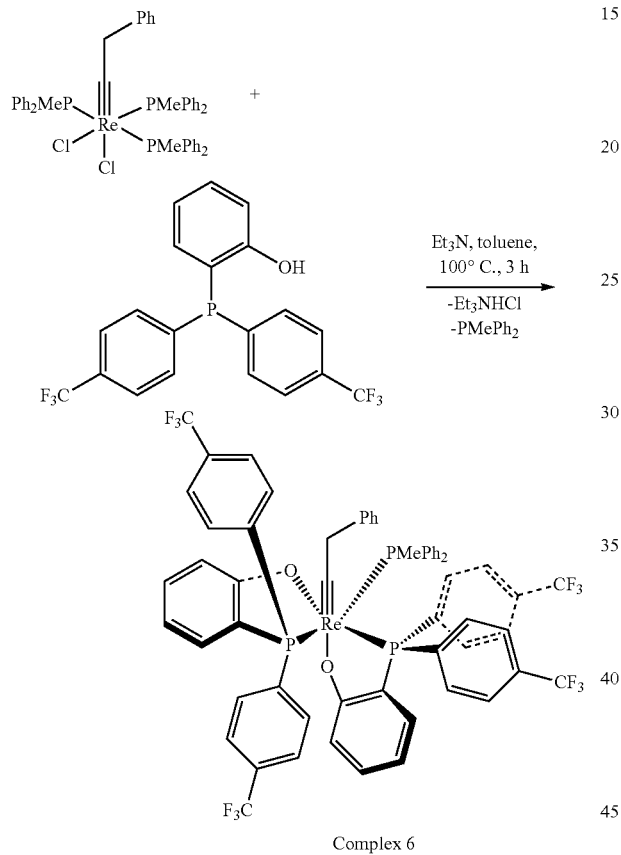

Complex 6

A mixture of Re(≡CCH$_2$Ph)Cl$_2$(PMePh$_2$)$_3$ (204 mg, 0.21 mmol), 2-{bis[4-(trifluoromethyl)phenyl]phosphino]}phenol (180 mg, 0.43 mmol) and Et$_3$N (214 mg, ca. 0.29 mL, 2.12 mmol) in 20 mL of toluene was heated at 100° C. for 3 hours. After cooling down to room temperature, the solution was filtered to remove triethylamine hydrochloride. The filtrate was evaporated under vacuum to give an orange oily residue. The residue was washed with hexane (5 mL×3) to give 105 mg of yellow solid. The hexane solution was stored in a −20° C. fridge for 1 day to give another 96 mg of yellow microcrystals. Yield: 202 mg, 72%.

$^1$H NMR (400 MHz, CDCl$_3$) δ 7.54–7.44 (m, 2H), 7.32–7.08 (m, 25H), 7.07–6.91 (m, 7H), 6.69 (t, J=8.2 Hz, 1H), 6.63 (dd, J=8.1, 5.8 Hz, 1H), 6.52 (dd, J=13.6, 6.8 Hz, 2H), 6.27–6.17 (m, 1H), 3.04 (dq, J=20.3, 2.9 Hz, 1H, ReCCH$_2$Ph), 2.84 (dq, J=20.3, 3.1 Hz, 1H, ReCCH$_2$Ph), 1.62 (d, J=8.8 Hz, 3H, PMePh$_2$). $^{13}$C{$^1$H} NMR (101 MHz, CDCl$_3$) δ 275.70–274.14 (m, ReC), 180.54 (d, J=10.1 Hz), 180.28 (d, J=11.6 Hz), 174.86 (d, J=23.6 Hz), 147.45 (s), 146.51 (s), 145.60 (s), 144.98 (s), 139.04 (s), 138.56 (s), 134.94–130.68 (m), 129.58 (s), 129.34 (s), 128.86 (s), 128.39 (s), 127.93 (d, J=9.4 Hz), 127.68 (d, J=9.4 Hz), 126.90 (s), 125.36–124.54 (m), 124.14 (dd, J=9.8, 3.6 Hz), 122.68–121.85 (m), 120.92 (d, J=7.9 Hz), 117.04–114.91 (m), 54.92 (s, ReCCH$_2$Ph), 11.76 (d, J=31.0 Hz, PMePh$_2$). $^{19}$F{$^1$H} NMR (376 MHz, CDCl$_3$) δ −62.83, −63.02, −63.04, −63.14 (all s). $^{31}$P{$^1$H} NMR (162 MHz, CDCl$_3$) δ 38.87 (s, 1P), 31.55 (d, J=215.4 Hz, 1P), 3.70 (d, J=223.4 Hz, 1P). Anal. Calcd for C$_{61}$H$_{44}$F$_{12}$O$_2$P$_3$Re: C, 55.67; H, 3.37. Found: C, 65.48; H, 5.02; N, 2.63.

Example 7—Synthesis of Cis-Re(≡CCH$_2$pH)($^{Fyxl}$PO)$_2$(PMePh$_2$) (Complex 7) and Trans-Re(≡CCH$_2$pH)($^{Fyxl}$PO)$_2$(PMePh$_2$) (Complex 8)

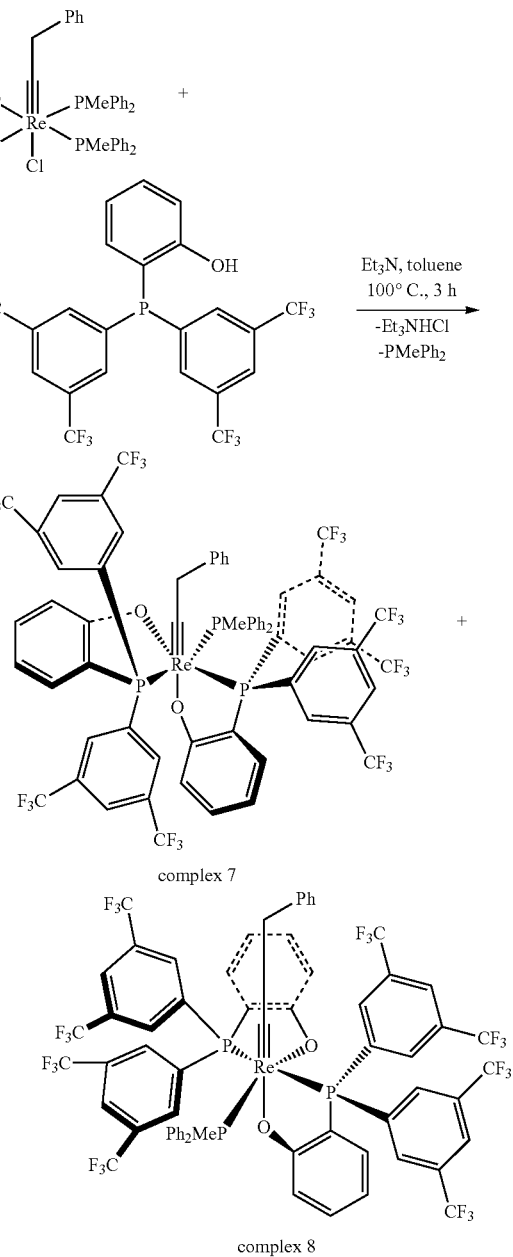

complex 7 complex 8

A mixture of Re(≡CCH₂Ph)Cl₂(PMePh₂)₃ (1.09 g, 1.13 mmol), 2-{bis[3,5-bis(trifluoromethyl)phenyl]phosphino}phenol (1.31 g, 2.38 mmol) and Et₃N (573 mg, ca. 0.78 mL, 5.67 mmol) in 40 mL of toluene was heated at 100° C. for 3 hours. After cooling down to room temperature, the solution was filtered to remove triethylamine hydrochloride. The filtrate was evaporated under vacuum to give an orange oily residue. The residue was washed with degassed MeOH (5 mL×3) to give a yellow solid as a mixture of Complex 7 and 8. Yield: 1.28 g, 71%.

The pure samples of Complex 7 and Complex 8 for analysis were obtained by the following method: 170 mg of the mixture of Complex 7 and Complex 8 in a degassed Schlenk flask was washed with degassed ACN (3 mL×3) to give Complex 8 as a yellow powder. Yield: 57 mg, 34%. The ACN filtrate was stored in a −20° C. fridge for days to give Complex 7 as yellow crystals. Yield: 84 mg, 49%.

complex 7

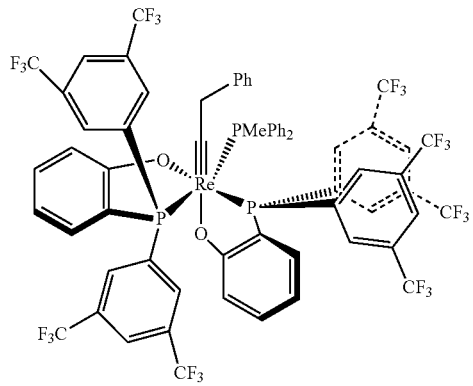

¹H NMR (400 MHz, CDCl₃) δ 8.26 (d, J=9.9 Hz, 2H), 7.85 (d, J=11.1 Hz, 2H), 7.73 (d, J=9.9 Hz, 2H), 7.56 (s, 1H), 7.50 (s, 1H), 7.44–7.32 (m, 2H), 7.32–6.97 (m, 19H), 6.88 (t, J=7.6 Hz, 1H), 6.79–6.45 (m, 4H), 6.02 (dd, J=8.1, 6.1 Hz, 1H), 3.57 (d, J=20.0 Hz, 1H, ReCCH₂Ph), 3.41 (dq, J=20.2, 3.0 Hz, 1H, ReCCH₂Ph), 1.57 (d, J=8.9 Hz, 3H, PMePh₂). ¹³C{¹H} NMR (101 MHz, CDCl₃) δ 276.1–275.9 (m, ReC), 180.0 (J=8.5 Hz), 179.7 (d, J=8.6 Hz), 174.4 (s), 174.2 (s), 145.8–144.8 (m), 137.5 (s), 137.1 (s), 134.3 (s), 133.8 (s), 133.6 (s), 133.3–131.8 (m), 131.8–131.2 (m), 131.2–130.4 (m), 130.0 (s), 129.7 (d, J=15.0 Hz), 129.2 (s), 129.0–128.5 (m), 128.0 (d, J=9.8 Hz), 127.8 (d, J=9.7 Hz), 127.4 (s), 124.8 (s), 124.1 (d, J=13.3 Hz), 123.4 (s), 122.8 (d, J=7.3 Hz), 121.6–121.2 (m), 117.8 (d, J=6.9 Hz), 116.4 (d, J=6.5 Hz), 114.0 (s), 113.5 (s), 56.0 (s, ReCCH₂Ph), 11.4 (d, J=32.6 Hz, PMePh₂). ¹⁹F{¹H} NMR (376 MHz, CDCl₃) δ −62.98 (s), −63.14 (s), −63.34 (s). ³¹P{¹H} NMR (162 MHz, CDCl₃) δ 42.69 (s), 38.07 (d, J=220.8 Hz), 6.76 (d, J=221.4 Hz). Anal. Calcd for C₆₅H₄₀F₂₄O₂P₃Re: C, 49.16; H, 2.54. Found: C, 48.73; H, 2.90.

complex 8

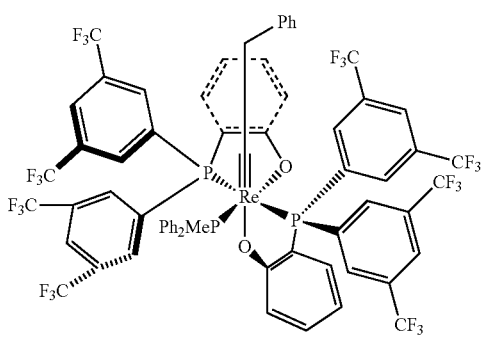

¹H NMR (400 MHz, CDCl₃) δ 8.11 (d, J=10.3 Hz, 2H), 7.99–7.96 (m, 3H), 7.89 (s, 1H), 7.80 (s, 1H), 7.66–7.63 (m, 3H), 7.65 (d, J=9.9 Hz, 2H), 7.39 (t, J=7.7 Hz, 1H), 7.24–7.12 (m, 2H), 7.12–6.65 (m, 19H), 6.54 (t, J=7.3 Hz, 1H), 2.94 (dd, J=20.5, 2.8 Hz, 1H), 2.31 (dd, J=20.4, 2.7 Hz, 1H), 1.63 (d, J=8.2 Hz, 3H). ¹³C{¹H} NMR (101 MHz, CDCl₃) δ 280.7–278.0 (m), 180.8 (d, J=7.3 Hz), 180.5 (d, J=7.2 Hz), 177.4 (d, J=5.9 Hz), 177.2 (d, J=5.9 Hz), 142.4 (s), 142.0 (s), 138.8–136.7 (m), 136.2 (s), 135.8 (s), 135.2–135.1 (m), 134.2 (s), 134.1–127.1 (m), 126.9 (s), 124.6–123.8 (m), 122.5 (d, J=7.7 Hz), 121.8 (d, J=4.6 Hz), 121.5 (d, J=5.1 Hz), 121.0 (d, J=7.7 Hz), 119.1 (d, J=5.0 Hz), 118.7 (d, J=5.0 Hz), 117.6 (d, J=7.0 Hz), 116.8 (d, J=6.4 Hz), 114.8 (d, J=3.5 Hz), 114.3 (d, J=3.1 Hz), 113.1 (s), 112.6 (s), 55.6 (s), 14.9 (d, J=33.8 Hz). ¹⁹F{¹H} NMR (376 MHz, CDCl₃) δ −62.65, −62.70, −62.77, −62.86. ³¹P{¹H} NMR (162 MHz, CDCl₃) δ 38.01 (d, J=204.9 Hz), 28.46 (dd, J=204.9, 5.9 Hz), −8.53 (s). Anal. Calcd for C₆₅H₄₀F₂₄O₂P₃Re: C, 49.16; H, 2.54. Found: C, 49.05; H, 2.90.

Example 8—Synthesis of Re(≡CCH₂Ph)($^{Ph}$P$^{4-CF3-Ph}$O)₂(PMePh₂) (Complex 9)

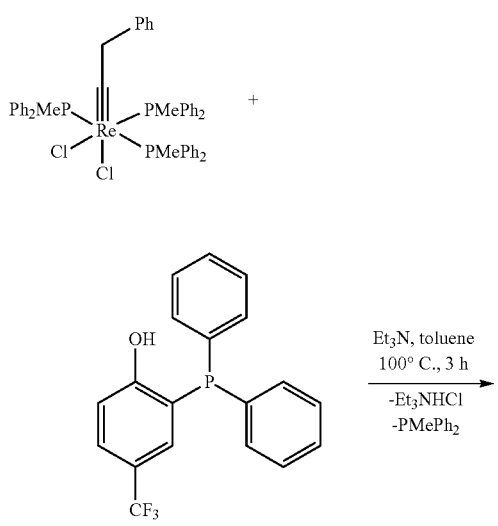

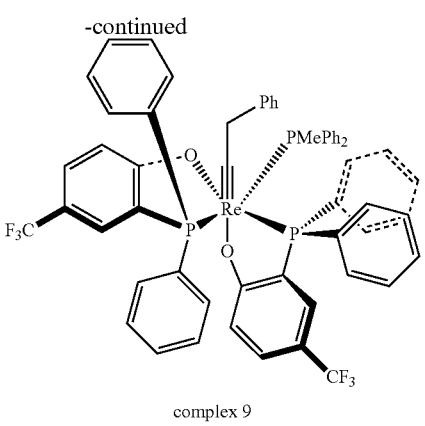

complex 9

A mixture of Re(≡CCH₂Ph)Cl₂(PMePh₂)₃ (211 mg, 0.22 mmol), (2-hydroxy-5-trifluoromethylphenyl) diphenylphosphine (160 mg, 0.46 mmol) and Et₃N (304 μL, 2.2 mmol) in 10 mL of toluene was heated at 100° C. for 3 hours. After cooling down to room temperature, the solution was filtered to remove triethylamine hydrochloride. The filtrate was evaporated under vacuum to give an orange oily residue. The residue was washed with hexane (5 mL×3) and degassed methanol (1 mL×3) to give a yellow solid. Yield: 188 mg, 81%.

¹H NMR (400 MHz, CDCl₃) δ 7.48 (d, J=7.0 Hz, 1H), 7.41–7.22 (m, 12H), 7.21–6.94 (m, 22H), 6.84–6.79 (m, 4H), 6.45 (dd, J=8.8, 4.8 Hz, 1H), 6.16 (dd, J=8.8, 5.1 Hz, 1H), 2.95 (dq, J=19.8, 3.3 Hz, 1H), 2.82 (dq, J=19.7, 3.1 Hz, 1H), 1.22 (d, J=8.6 Hz, 3H). ¹³C{¹H} NMR (101 MHz, CDCl₃) δ 277.21–275.34 (m), 182.25 (dd, J=23.6, 8.6 Hz), 176.79 (d, J=22.5 Hz), 142.37 (d, J=24.9 Hz), 141.84 (d, J=28.9 Hz), 135.43 (s), 134.98 (s), 134.84 (s), 134.35 (s), 133.91 (d, J=11.1 Hz), 133.28 (d, J=10.3 Hz), 132.84 (dd, J=9.4, 5.9 Hz), 132.33 (t, J=10.3 Hz), 131.38 (d, J=3.9 Hz), 130.04–129.48 (m), 129.48–129.00 (m), 128.73 (d, J=2.0 Hz), 128.63–127.81 (m), 127.87–127.35 (m), 126.88–126.46 (m), 124.00 (d, J=21.1 Hz), 121.44 (d, J=6.5 Hz), 120.61 (d, J=7.5 Hz), 119.89 (s), 119.38 (s), 118.85 (s), 118.35 (s), 117.88 (d, J=6.6 Hz), 117.55 (d, J=6.4 Hz), 116.07 (d, J=6.8 Hz), 115.75 (d, J=6.5 Hz), 55.28 (s), 12.89 (d, J=31.7 Hz). ¹⁹F{¹H} NMR (376 MHz, CDCl₃) δ−60.13, −60.20. ³¹P{¹zH} NMR (162 MHz, CDCl₃) δ 38.45 (s), 29.92 (d, J=219.8 Hz), 4.16 (d, J=219.5 Hz). Anal. Calcd for C₅₉H₄₆F₆O₂P₃Re: C, 60.05; H, 3.93. Found: C, 60.04; H, 4.06.

Example 9—Preparation of Re(≡CCH₂Ph)(PhPO)₂(py) (Complex 10)

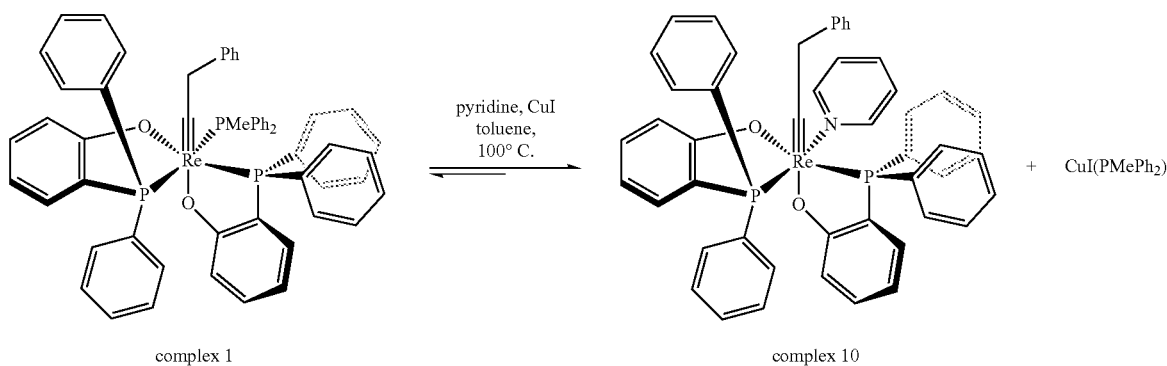

Method A. A mixture of Re(≡CCH$_2$Ph)($^{Ph}$PO)$_2$(PMePh$_2$) (Complex 1) (522 mg, 0.50 mmol), pyridine (395 mg, ca. 0.4 mL, 5.0 mmol), CuI (100 mg, 0.525 mmol) and 20 mL of toluene was heated at 100° C. for 4 hours. The mixture was cooled down and the volatiles were totally removed under vacuum to give an oily residue. The residue was washed with hexane (5 mL×2) and extracted with DCM until the extract become colorless. The extraction was exposed to air for two weeks to oxidize CuI(PMePh$_2$) and then evaporated to give an orange oily residue. The residue was extracted with methanol (5 mL×3). The methanol extraction was concentrated to ca. 3 mL to crystallize the crude product, which was recrystallized in methanol once again to give the desired product as orange crystals. Yield: 129 mg, 28%.

Method B. A mixture of Re(≡CCH$_2$Ph)($^{Ph}$PO)$_2$(PMePh$_2$) (Complex 1) (209 mg, 0.20 mmol), pyridine (158 mg, ca. 0.16 mL, 2.0 mmol), CuI (42 mg, 0.22 mmol) and 15 mL of toluene was heated at 100° C. for 4 hours. After heating, the mixture was cooled down and the volatiles were totally removed under vacuum to give an oily residue. The residue was washed with hexane (3 mL×2) and dissolved with 20 mL of DCM. The DCM extraction was washed with 25 w % ammonia solution in air in 10 mL portions to remove copper salts until the aqueous phase becomes colorless. The organic phase was then washed with 10 mL of water, dried with Na$_2$SO$_4$ and evaporated on a rotary evaporator to give an orange residue. After washing with hexane (5 mL×3) to remove free phosphines, the residue was dissolved with 10 mL of degassed toluene and heated with 0.32 mL of pyridine at 100° C. for 1 hour under N$_2$. The volatiles were evaporated under vacuum to give a yellow solid, which was dried in a vacuum drier for overnight to give the desired product as a yellow solid. Yield: 126 mg, 68%.

$^1$H NMR (400 MHz, CDCl$_3$): δ 8.31 (d, J=5.7 Hz, 2H), 7.50–7.46 (m, 2H), 7.40–7.03 (m, 21H), 6.93–6.80 (m, 8H), 6.58 (t, J=6.8 Hz, 2H), 6.58 (t, J=7.2 Hz, 1H), 6.40 (t, J=7.2 Hz, 1H), 6.19 (dd, J=7.9, 5.6 Hz, 1H), 2.88 (dt, J=18.9, 3.2 Hz, 1H, ReCCH$_2$Ph), 2.58 (dt, J=18.9, 3.6 Hz, 1H, ReCCH$_2$Ph). $^{13}$C{$^1$H} NMR (101 MHz, CDCl$_3$): δ 268.1 (t, J=13.3 Hz), 179.2 (d, J=19.8 Hz), 173.9 (d, J=22.4 Hz), 153.3 (s), 140.6–126.4 (m), 123.9 (s), 121.3–120.8 (m), 119.7 (s), 119.2 (s), 116.2 (d, J=6.8 Hz), 114.7 (d, J=6.6 Hz), 54.8 (s, ReCCH$_2$Ph). $^{31}$P{$^1$H} NMR (162 MHz, CDCl$_3$): δ 46.3 (s, 1P), 30.9 (s, 1P). Anal. Calcd for C$_{49}$H$_{40}$NO$_2$P$_2$Re: C, 63.76; H, 4.37; N, 1.52. Found: C, 63.49; H, 4.42; N, 1.52.

Example 10—Synthesis of Re(≡CCH$_2$Ph)($^{4\text{-}MeO\text{-}Ph}$PO)$_2$(py) (Complex 11)

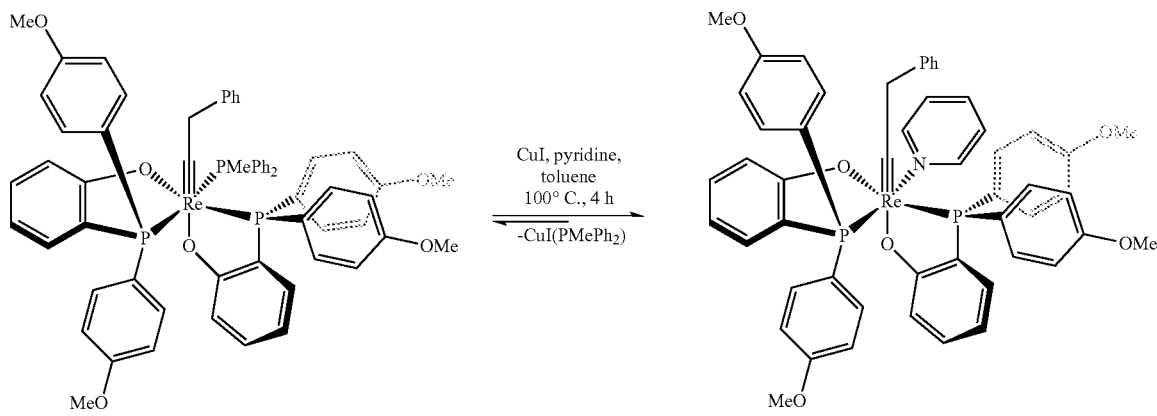

Complex 3        Complex 11

A mixture of Re(≡CCH$_2$Ph)($^{4-MeO-Ph}$PO)$_2$(PMePh$_2$) (Complex 3) (233 mg, 0.20 mmol), pyridine (158 mg, ca. 0.16 mL, 2.0 mmol), CuI (42 mg, 0.22 mmol) and 15 mL of toluene was heated at 110° C. for 4 hours. After heating, the mixture was cooled down and the volatiles were totally removed under vacuum to give an oily residue. The residue was washed with hexane (5 mL×2) and dissolved with 20 mL of DCM. The DCM extraction was washed with 25 w % ammonia solution in air in 10 mL portions to remove copper salts until the aqueous phase becomes colorless. The organic phase was then washed with 10 mL of water, dried with Na$_2$SO$_4$ and evaporated on a rotary evaporator to give an orange residue. After washing with a mixture of hexane and Et$_2$O (v/v=1:1, 5 mL×3) to remove free phosphines, the residue was dissolved with 10 mL of degassed toluene and heated with 0.32 mL of pyridine at 100° C. for 1 hour under N$_2$. The volatiles were evaporated under vacuum to give a yellow solid, which was dried in a vacuum drier for overnight to give the desired product as a yellow solid. Yield: 136 mg, 65%.

$^1$H NMR (400 MHz, CDCl$_3$) δ 8.29 (d, J=6.1 Hz, 2H), 7.65–7.55 (m, 2H), 7.31 (dd, J=14.7, 5.9 Hz, 3H), 7.25–7.05 (m, 8H), 7.02–6.84 (m, 5H), 6.77–6.69 (m, 6H), 6.67–6.57 (m, 3H), 6.37 (d, J=8.8 Hz, 2H), 6.32 (dd, J=8.7, 1.5 Hz, 2H), 6.03 (dd, J=8.1, 5.5 Hz, 1H), 3.86 (s, 3H), 3.79 (s, 3H), 3.67 (s, 3H), 3.64 (s, 3H), 2.95 (dt, J=18.9, 3.5 Hz, 1H), 2.80 (dt, J=18.9, 3.1 Hz, 1H). $^{13}$C{$^1$H} NMR (101 MHz, CDCl$_3$) δ 267.11 (t, J=14.0 Hz, ReC), 178.68 (d, J=20.0 Hz), 173.27 (d, J=22.1 Hz), 163.00 (s), 161.15 (s), 160.36 (s), 160.23 (s), 159.71 (s), 153.19 (s), 136.98–127.82 (m), 126.35 (s), 123.76 (s), 121.32 (dt, J=51.9, 41.3 Hz), 119.19–118.39 (m), 116.55–112.27 (m), 55.40 (s), 55.35 (s), 55.27 (s), 55.09 (s). $^{31}$P{$^1$H} NMR (162 MHz, CDCl$_3$) δ 43.72, 31.27. Anal. Calcd for C$_{53}$H$_{48}$NO$_6$P$_2$Re: C, 61.03; H, 4.64; N, 1.34. Found: C, 61.27; H, 4.84; N, 1.62.

Example 11—Synthesis of Re(≡CCH$_2$Ph)($^{2,4-F2-Ph}$PO)$_2$(py) (Complex 12)

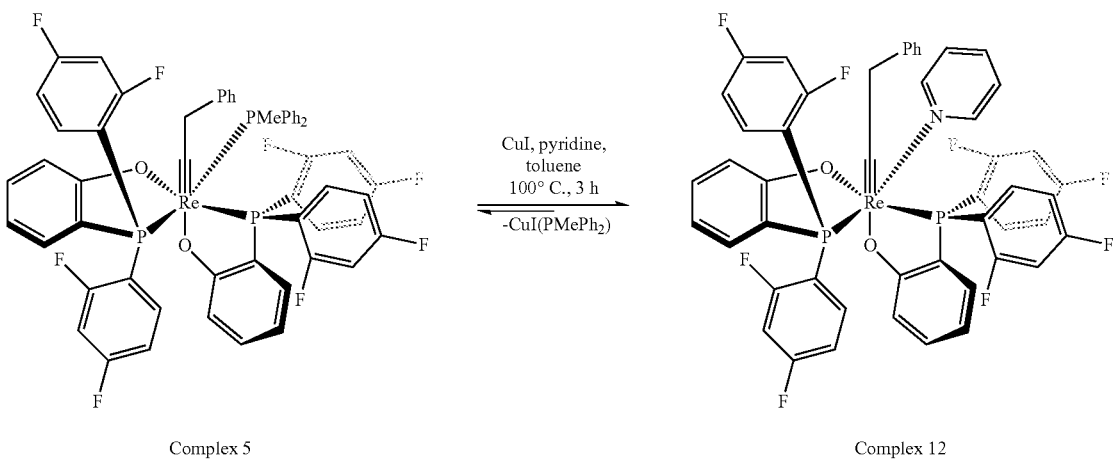

Complex 5        Complex 12

A mixture of Re(≡CCH$_2$Ph)($^{2,4\text{-}F2\text{-}Ph}$PO)$_2$(PMePh$_2$) (Complex 5) (200 mg, 0.168 mmol), pyridine (133 mg, ca. 135 μL, 1.68 mmol), CuI (34 mg, 0.177 mmol) and 10 mL of toluene was heated at 100° C. for 4 hours. After heating, the mixture was cooled down and the volatiles were totally removed under vacuum. The residue was washed with hexane (5 mL×2) and extracted with diethyl ether (3 mL×4). The extraction was washed with 25 w % ammonia solution in air in 10 mL portions to remove copper salts until the aqueous phase became colorless. The organic phase was then washed with 10 mL of water, dried with Na$_2$SO$_4$ and evaporated on a rotary evaporator to give a yellow residue. After washing with hexane (3 mL×3) to remove free phosphines, the residue was dissolved with 10 mL of degassed toluene and heated with 0.27 mL of pyridine at 80° C. for 1 hour under N$_2$. The volatiles were evaporated under vacuum to give a yellow solid, which was dried in a vacuum drier for overnight to give the desired product. Yield: 90 mg, 50%.

$^1$H NMR (400 MHz, CDCl$_3$) δ 8.28 (d, J=6.5 Hz, 2H), 7.96 (tt, J=15.5, 8.0 Hz, 1H), 7.58–7.43 (m, 1H), 7.42–7.21 (m, 7H), 7.18 (t, J=7.3 Hz, 1H), 7.10 (dd, J=8.1, 6.2 Hz, 1H), 7.06–6.97 (m, 1H), 6.93 (ddd, J=9.8, 5.7, 1.9 Hz, 1H), 6.89–6.75 (m, 4H), 6.71 (t, J=7.0 Hz, 2H), 6.63 (dt, J=13.3, 4.7 Hz, 2H), 6.55 (ddd, J=11.9, 4.4, 2.0 Hz, 1H), 6.48 (t, J=7.4 Hz, 1H), 6.40 (dd, J=11.5, 4.6 Hz, 1H), 6.29–6.16 (m, 2H), 6.04–5.94 (m, 1H), 5.90 (dd, J=7.8, 6.6 Hz, 1H), 3.38 (dt, J=19.6, 2.9 Hz, 1H), 3.04 (d, J=19.0 Hz, 1H). $^{13}$C{$^1$H} NMR (101 MHz, CDCl$_3$) δ 271.74–271.15 (m), 178.80 (d, J=21.8 Hz), 172.42 (d, J=24.8 Hz), 167.25–160.82 (m), 152.67 (s), 142.58 (dd, J=18.3, 8.8 Hz), 136.85–135.77 (m), 134.90 (s), 133.56–132.12 (m), 131.07 (d, J=9.8 Hz), 128.82 (d, J=11.3 Hz), 126.58 (s), 124.16 (s), 122.68 (dd, J=46.3, 20.2 Hz), 121.18 (d, J=8.5 Hz), 120.71 (d, J=7.3 Hz), 119.28–117.21 (m), 116.96 (d, J=7.3 Hz), 115.78 (d, J=6.8 Hz), 113.20–112.02 (m), 112.02–109.90 (m), 104.71 (dt, J=49.8, 26.6 Hz), 103.91–102.11 (m), 54.80 (s). $^{19}$F{$^1$H} NMR (376 MHz, CDCl$_3$) δ–89.67 (s), −94.10 (s), −94.49–−95.21 (m), −99.80–−100.47 (m), −105.59 (dt, J=16.3, 7.9 Hz), −105.76–−106.22 (m), −107.75 (s), −109.34 (p, J=8.3 Hz). $^{31}$P{$^1$H} NMR (162 MHz, CDCl$_3$) δ 40.31, 22.67.

Example 12—Synthesis of Re(≡CCH$_2$Ph)($^{4\text{-}CF3\text{-}pH}$PO)$_2$(Py) (Complex 13)

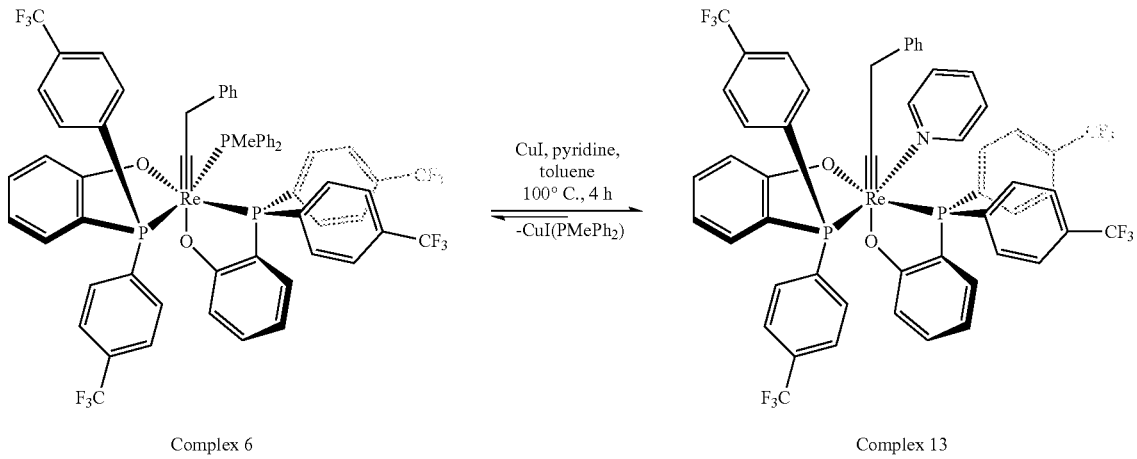

Complex 6     Complex 13

A mixture of Re(≡CCH₂Ph)($^{4\text{-}CF3\text{-}Ph}$PO)₂(PMePh₂) (Complex 6) (625 mg, 0.475 mmol), pyridine (563 mg, ca. 0.57 mL, 7.1 mmol), CuI (95 mg, 0.50 mmol) and 35 mL of toluene was heated at 100° C. for 4 hours. After heating, the mixture was cooled down and the volatiles were totally removed under vacuum. The residue was washed with hexane (5 mL×3) and extracted with Et₂O until the extraction became colorless. The extraction was washed with 25 w % ammonia solution in air in 10 mL portions to remove copper salts until the aqueous phase became colorless. The organic phase was then washed with 10 mL of water, dried with Na₂SO₄ and evaporated on a rotary evaporator to give an orange residue. The residue was washed with hexane (5 mL×4) and dried under vacuum to give a yellow solid, which was further dried in a vacuum drier for overnight to give the desired product. Yield: 411 mg, 72%.

$^{1}$H NMR (400 MHz, CDCl₃) δ 8.23 (d, J=6.4 Hz, 2H, py), 7.73 (dd, J=10.5, 8.4 Hz, 2H), 7.55–7.38 (m, 7H), 7.34–7.28 (m, 1H), 7.23–7.17 (m, 3H), 7.17–7.02 (m, 10H), 6.86–6.73 (m, 6H), 6.63 (t, J=7.3 Hz, 1H), 6.44 (t, J=7.4 Hz, 1H), 5.97 (dd, J=8.3, 5.7 Hz, 1H), 3.03 (dt, J=19.1, 3.4 Hz, 1H, ReCCH₂Ph), 2.94 (dt, J=19.1, 3.1 Hz, 1H, ReCCH₂Ph). $^{13}$C{$^{1}$H} NMR (101 MHz, CDCl₃) δ 269.06 (t, J=13.6 Hz, ReC), 179.25 (d, J=20.8 Hz), 173.47 (d, J=22.8 Hz), 152.84 (s), 144.32 (s), 143.81 (s), 143.18 (s), 142.62 (s), 140.33 (s), 139.83 (s), 136.56 (s), 135.24 (d, J=12.0 Hz), 134.21–130.60 (m), 130.10 (s), 129.02 (s), 128.92 (s), 127.04 (s), 125.39–123.90 (m), 122.74–122.15 (m), 121.31 (t, J=9.8 Hz), 118.94 (s), 118.39 (s), 117.45–117.04 (m), 116.80 (s), 115.80 (d, J=6.5 Hz), 55.21 (s, ReCCH₂Ph). $^{19}$F{$^{1}$H} NMR (376 MHz, CDCl₃) δ −62.93, −63.02, −63.03. $^{31}$P{$^{1}$H} NMR (162 MHz, CDCl₃) δ 49.25, 35.61. Anal. Calcd for C₅₃H₃₆F₁₂N₂P₂Re: C, 53.27; H, 3.04; N, 1.17. Found: C, 52.94; H, 3.55; N, 1.16.

Example 13—Synthesis of Re(≡CCH₂Ph)₂($^{Fxyl}$PO)₂(py) (Complex 14)

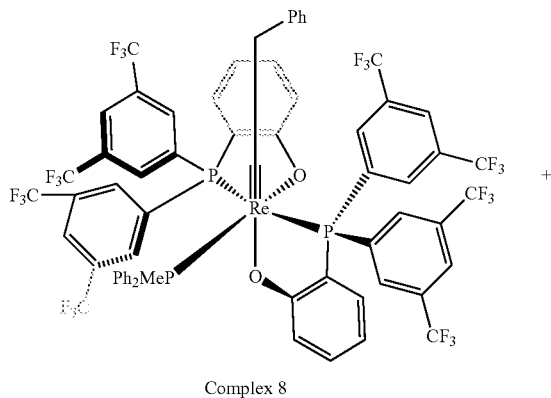

Complex 8

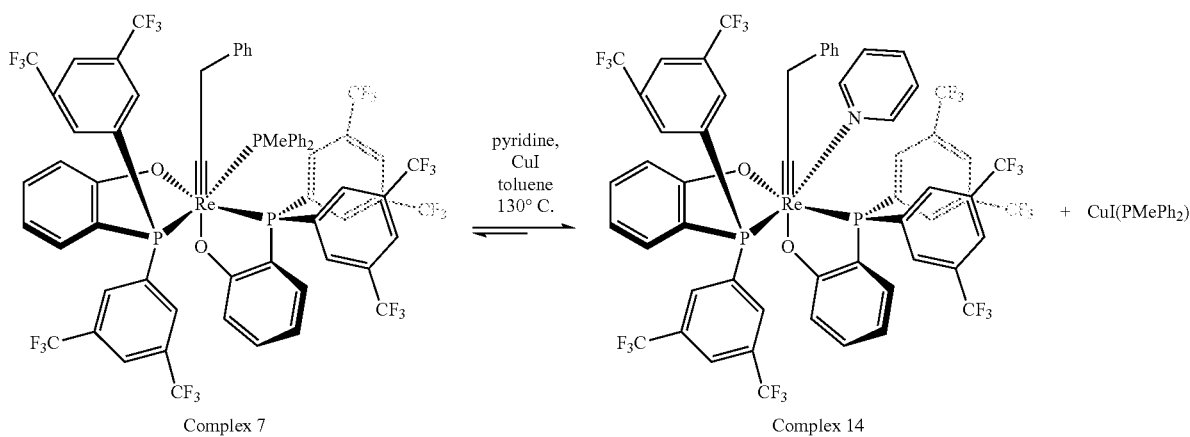

Complex 7     Complex 14

In a sealed tube, a mixture of trans- and cis-Re(≡CCH$_2$Ph)($^{Fxyl}$PO)$_2$(PMePh$_2$) (Complex 7 and Complex 8, 500 mg, 0.315 mmol) and CuI (67 mg, 0.35 mmol) was degassed for 3 times. 255 µL of pyridine (250 mg, 3.15 mmol) and 25 mL of toluene were then injected. After heating at 130° C. for 3 hours, the mixture was cooled down and the volatiles were totally removed under vacuum to give an oily residue. The residue was washed with hexane (5 mL×3) to remove a trace amount of free PMePh$_2$ and then extracted with Et$_2$O (8 mL×3) to remove most of the insoluble copper complex CuI(PMePh$_2$). The extraction was exposed to air and evaporated on a rotary evaporator to give a yellow solid as the crude product, which was stored in air for a week to oxidize the residual CuI(PMePh$_2$). The crude product was washed with MeOH (3 mL×3) to remove phosphine oxides and then extracted with Et$_2$O to remove copper salts. The extraction was evaporated under vacuum to afford pure Complex 14 as a golden yellow solid. Yield: 283 mg, 61%.

$^1$H NMR (400 MHz, CDCl$_3$): 8.32 (d, J=10.6 Hz, 2H), 8.08–7.98 (m, 6H), 7.57 (s, 1H), 7.49 (s, 1H), 7.41–7.35 (m, 4H), 7.26–7.25 (m, 5H), 7.18–7.14 (m, 1H), 6.95 (d, J=9.9 Hz, 2H), 6.83–6.67 (m, 6H), 6.37 (t, J=7.4 Hz, 1H), 6.03–6.00 (m, 1H), 3.50 (dt, J=18.9, 3.5 Hz, 1H, ReCCH$_2$Ph), 3.29 (dt, J=19.4, 3.6 Hz, 1H, ReCCH$_2$Ph). $^{13}$C NMR (101 MHz, CDCl$_3$): δ 271.1 (t, J=15.4 Hz, ReCCH$_2$Ph), 178.6 (d, J=21.2 Hz), 172.6 (d, J=23.0 Hz), 152.5 (s), 143.6 (s), 143.2 (s), 139.8 (s), 139.3 (s), 138.0 (s), 137.5 (s), 137.2 (s), 134.7–129.7 (m), 129.3 (s), 128.7 (s), 127.5 (s), 126.9–126.7 (m), 125.5–121.3 (m), 118.8–118.6 (m), 118.2 (d, J=7.5 Hz), 117.0 (d, J=6.8 Hz), 116.5 (s), 115.9 (s), 115.4 (s), 114.8 (s), 55.8 (s, ReCCH$_2$Ph). $^{19}$F NMR (376 MHz, CDCl$_3$) δ −62.88, −63.18, −63.43, −63.48. $^{31}$P NMR (162.0 MHz, CDCl$_3$): δ 54.0 (s, 1P), 40.1 (s, 1P). Anal. Calcd for C$_{57}$H$_{32}$F$_{24}$NO$_2$P$_2$Re: C, 46.67; H, 2.20. Found: 46.80, 2.33, 0.91.

Example 14—Synthesis of Re(≡CCH$_2$Ph)($^{Fxyl}$PO)$_2$($^{4-CF3}$py) (Complex 15)

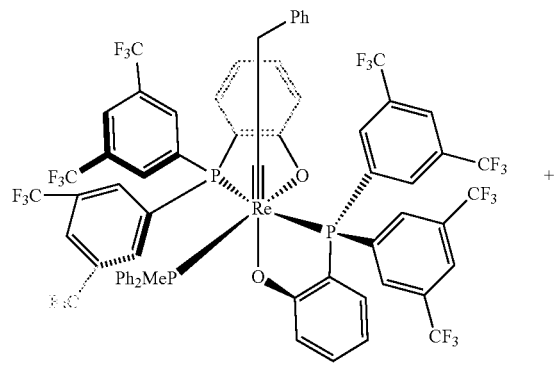

Complex 8

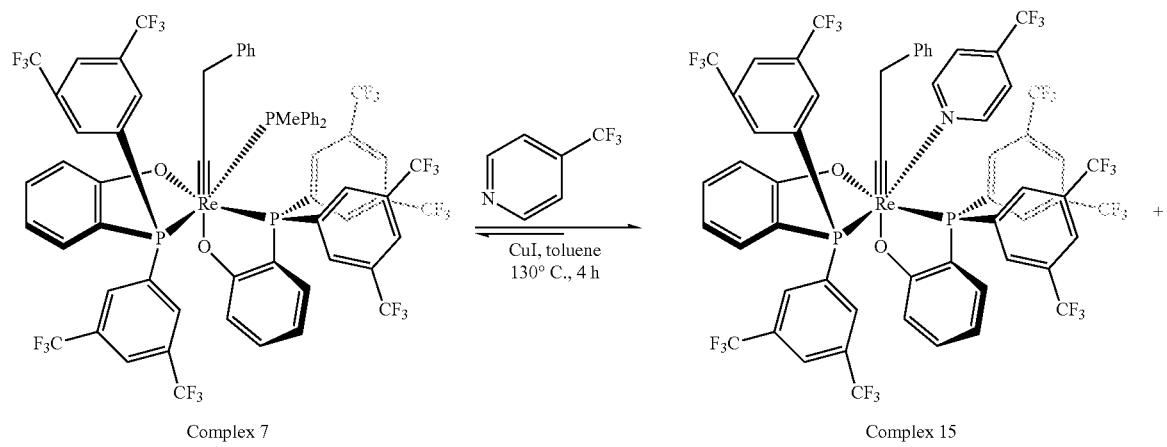

Complex 7      Complex 15

CuI(PMePh$_2$)

In a sealed tube, the mixture of trans- and cis-Re(≡CCH$_2$Ph)($^{Fxyl}$PO)$_2$(PMePh$_2$) (Complex 8 and Complex 7, 175 mg, 0.11 mmol) and CuI (23 mg, 0.12 mmol) was degassed for 3 times. 180 μL of 4-trifluoromethylpyridine (243 mg, 1.65 mmol) and 11 mL of toluene were then injected. After heating at 130° C. for 4 hours (achieve about 90% conversion rate indicated by the in situ $^{31}$P{$^1$H} NMR spectroscopy), the mixture was cooled down and volatiles were totally removed under vacuum to give an oily residue. The residue was washed with n-pentane (3 mL×3) to remove a trace amount of free PMePh$_2$ and then extracted with Et$_2$O (4 mL×3) to remove most of the insoluble copper complex CuI(PMePh$_2$). The extraction was exposed to air and evaporated on a rotary evaporator to give a yellow solid as the crude product, which was stored in air for a week to oxidize the residual CuI(PMePh$_2$). The crude product was washed with MeOH (1 mL×3) to remove phosphine oxides and then extracted with Et$_2$O to remove copper salts. The extraction was evaporated under vacuum to afford pure Complex 15 as a yellow solid. Yield: 82 mg, 49%.

$^1$H NMR (400 MHz, CDCl$_3$) δ 8.35 (d, J=10.7 Hz, 2H, py), 8.15 (d, J=5.8 Hz, 2H), 8.11 (s, 1H), 8.06 (d, J=10.7 Hz, 2H), 8.01 (s, 1H), 7.58 (s, 1H), 7.49 (s, 1H), 7.42–7.31 (m, 3H), 7.31–7.20 (m, 5H), 7.14 (dd, J=8.4, 5.9 Hz, 1H), 6.89 (dd, J=12.5, 8.3 Hz, 4H), 6.83–6.68 (m, 4H), 6.38 (t, J=7.7 Hz, 1H), 6.02 (dd, J=8.1, 5.9 Hz, 1H), 3.56 (dt, J=19.2, 3.1 Hz, 1H, ReCCH$_2$Ph), 3.27 (dt, J=19.1, 3.1 Hz, 1H, ReCCH$_2$Ph). $^{13}$C{$^1$H} NMR (101 MHz, CDCl$_3$) δ 273.16–270.61 (m, ReC), 178.35 (d, J=21.3 Hz), 172.40 (d, J=23.3 Hz), 153.46 (s), 143.34 (s), 142.91 (s), 139.46–137.09 (m), 135.18–129.96 (m), 129.53 (s), 128.79 (s), 128.70 (s), 127.71 (s), 126.65 (s), 125.73 (s), 125.26 (s), 124.56–119.96 (m), 118.49 (d, J=7.3 Hz), 117.36 (d, J=7.0 Hz), 116.05 (s), 115.50 (s), 115.11 (s), 114.57 (s), 29.85 (s, ReCCH$_2$Ph). $^{19}$F{$^1$H} NMR (376 MHz, CDCl$_3$) δ −63.12 (s, 6F), −63.17 (s, 6F), −63.47 (s, 12F), −65.41 (s, 3F, C$_5$H$_4$NCF$_3$). $^{31}$P{$^1$H} NMR (162 MHz, CDCl$_3$) δ 53.49, 39.66. Anal. Calcd for C$_{58}$H$_{31}$F$_{27}$NO$_2$P$_2$Re: C, 45.38; H, 2.04; N, 0.91. Found: 47.50, 2.36, 0.94.

Example 15—Synthesis of Re(≡CCH$_2$Ph)($^{Ph}$P$^{4-CF3-Ph}$PO)$_2$(py) (Complex 16)

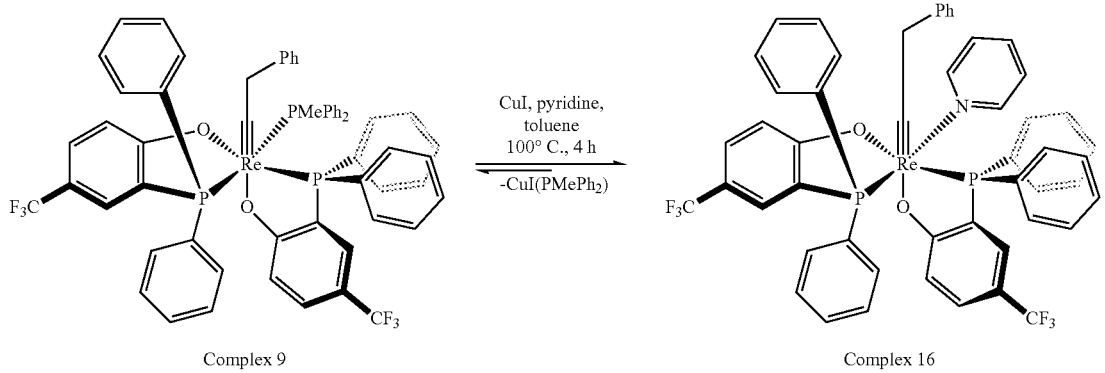

Complex 9    Complex 16

A mixture of Re(≡CCH$_2$Ph)($^{Ph}$P$^{4-CF3-Ph}$PO)$_2$(PMePh$_2$) (Complex 9) (200 mg, 0.17 mmol), pyridine (267 mg, ca. 0.27 mL, 3.4 mmol), CuI (35 mg, 0.19 mmol) and 15 mL of toluene was heated at 100° C. for 4 hours. After heating, the mixture was cooled down and the volatiles were totally removed under vacuum. The residue was washed with hexane (5 mL×2) and dissolved with 20 mL of DCM. The DCM extraction was washed with 25 w % ammonia solution in air in 10 mL portions to remove copper salts until the aqueous phase became colorless. The organic phase was then washed with 10 mL of water, dried with Na$_2$SO$_4$ and evaporated on a rotary evaporator to give an orange residue. After washing with hexane (5 mL×3) to remove free phosphines, the residue was dissolved with 10 mL of degassed toluene and heated with 0.54 mL of pyridine at 100° C. for 1 hour under N$_2$. The volatiles were evaporated under vacuum to give a pale yellow solid, which was dried in a vacuum drier for overnight to give the desired product. Yield: 120 mg, 67%.

$^1$H NMR (400 MHz, CDCl$_3$) δ 8.17 (d, J=6.3 Hz, 2H), 7.60 (dd, J=11.6, 7.6 Hz, 2H), 7.47 (dd, J=10.8, 8.4 Hz, 2H), 7.37 (dd, J=16.1, 8.5 Hz, 5H), 7.31–7.27 (m, 2H), 7.24–7.17 (m, 5H), 7.17–7.02 (m, 6H), 6.99–6.91 (m, 3H), 6.84 (dt, J=7.7, 6.1 Hz, 4H), 6.74 (t, J=6.9 Hz, 2H), 6.69–6.59 (m, 2H), 6.01 (dd, J=8.7, 5.2 Hz, 1H), 2.96 (dt, J=18.9, 3.5 Hz, 1H), 2.82 (dt, J=18.8, 3.1 Hz, 1H). $^{13}$C{$^1$H} NMR (101 MHz, CDCl$_3$) δ 271.32–268.73 (m), 181.38 (d, J=19.7 Hz), 176.00 (d, J=21.4 Hz), 139.08 (d, J=49.1 Hz), 137.83 (d, J=59.6 Hz), 136.11 (s), 135.72 (s), 135.29 (s), 135.17 (s), 134.33 (s), 133.02 (d, J=10.0 Hz), 132.58 (d, J=10.7 Hz), 131.76 (d, J=10.4 Hz), 130.80 (s), 130.00 (s), 129.73–127.31 (m), 126.73 (s), 124.09 (s), 121.87 (d, J=52.4 Hz), 120.95 (dd, J=30.4, 6.2 Hz), 120.17 (d, J=51.6 Hz), 55.16 (s). $^{19}$F{$^1$H} NMR (376 MHz, CDCl$_3$) δ −60.34, −60.48. $^{31}$P{$^1$H} NMR (162 MHz, CDCl$_3$) δ 46.96, 33.83. Anal. Calcd for C$_{51}$H$_{38}$F$_6$NO$_2$P$_2$Re: C, 57.84; H, 3.62; N, 1.32. Found: C, 57.72; H, 3.78; N, 1.29.

Example 16—Synthesis of Re(≡CC$_4$H$_3$S)($^{Fxyl}$PO)$_2$ (py) (Complex 17)

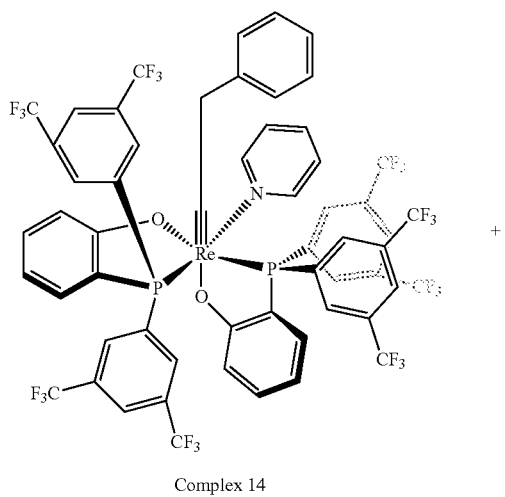

Complex 14

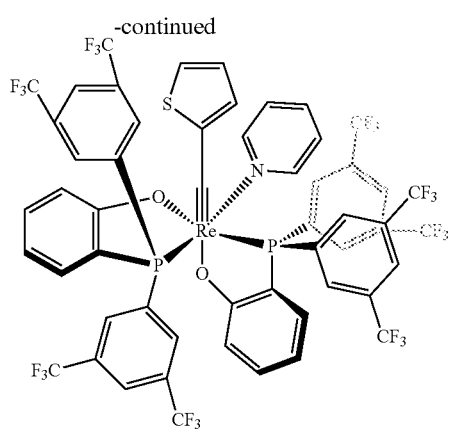

Complex 17

A mixture of Re(≡CCH$_2$Ph)($^{Fxyl}$PO)$_2$(py) (Complex 14) (88 mg, 0.06 mmol) and 2-propynylthiophene (37 mg, ca. 34 μL, 0.3 mmol) in 6 mL of toluene was heated at 100° C. for 2 hours. After the conversion was complete as indicated by in situ $^{31}$P{$^1$H} NMR, the volatiles were removed under vacuum. The residue was washed with hexane (2 mL×3) to give Complex 17 as an orange solid. Yield: 70 mg, 80%.

$^1$H NMR (400 MHz, CDCl$_3$) δ 8.32 (dd, J=12.2, 8.5 Hz, 4H), 8.13 (d, J=10.7 Hz, 2H), 8.05 (s, 1H), 7.90 (s, 1H), 7.56 (s, 1H), 7.51–7.38 (m, 4H), 7.38–7.27 (m, 3H), 7.18 (d, J=10.2 Hz, 2H), 7.13 (dd, J=8.3, 5.9 Hz, 1H), 6.98–6.87 (m, 3H), 6.82–6.76 (m, 3H), 6.71 (t, J=7.2 Hz, 1H), 6.40 (t, J=7.4 Hz, 1H), 6.09 (dd, J=8.1, 6.2 Hz, 1H). $^{13}$C{$^1$H} NMR (101 MHz, CDCl$_3$) δ 251.7 (t, J=13.4 Hz), 178.4 (d, J=21.5 Hz), 172.1 (d, J=23.7 Hz), 153.8 (s), 151.8 (s), 143.7 (s), 143.2 (s), 140.4 (s), 139.9 (s), 137.4 (s), 136.9 (s), 135.3 (d, J=12.3 Hz), 134.4 (s), 133.8 (s), 133.4–130.0 (m), 129.3 (s), 128.9 (s), 127.4 (s), 126.8 (dd, J=9.1, 4.1 Hz), 125.8 (s), 125.2 (s), 125.0 (s), 124.0 (dd, J=8.8, 4.3 Hz), 123.8 (d, J=2.7 Hz), 123.1 (s), 121.9 (d, J=7.2 Hz), 121.5–121.3 (m), 118.6 (d, J=7.0 Hz), 117.4 (d, J=6.9 Hz), 116.3 (s), 115.8 (s), 114.7 (s), 114.2 (s). $^{19}$F {$^1$H} NMR (376 MHz, CDCl$_3$) δ−63.21, −63.42, −63.47, −63.56. $^{31}$P{$^1$H} NMR (162 MHz, CDCl$_3$) δ 53.24, 38.54. Anal. Calcd for C$_{56}$H$_{33}$F$_{24}$NO$_{2.5}$P$_2$ReS: C, 44.96; H, 2.22; N, 0.94. Found: C, 44.93; H, 2.53; N, 0.82.

Example 17—Synthesis of Re(≡CCH$_2$Ph)($^{Cy}$PO)$_2$ (PMePh$_2$) (Complex 18)

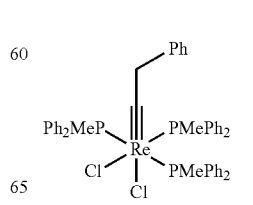

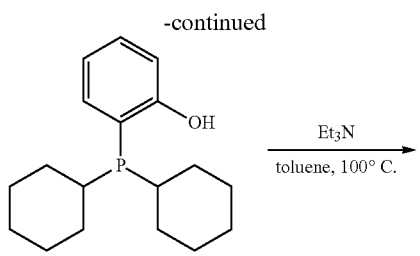

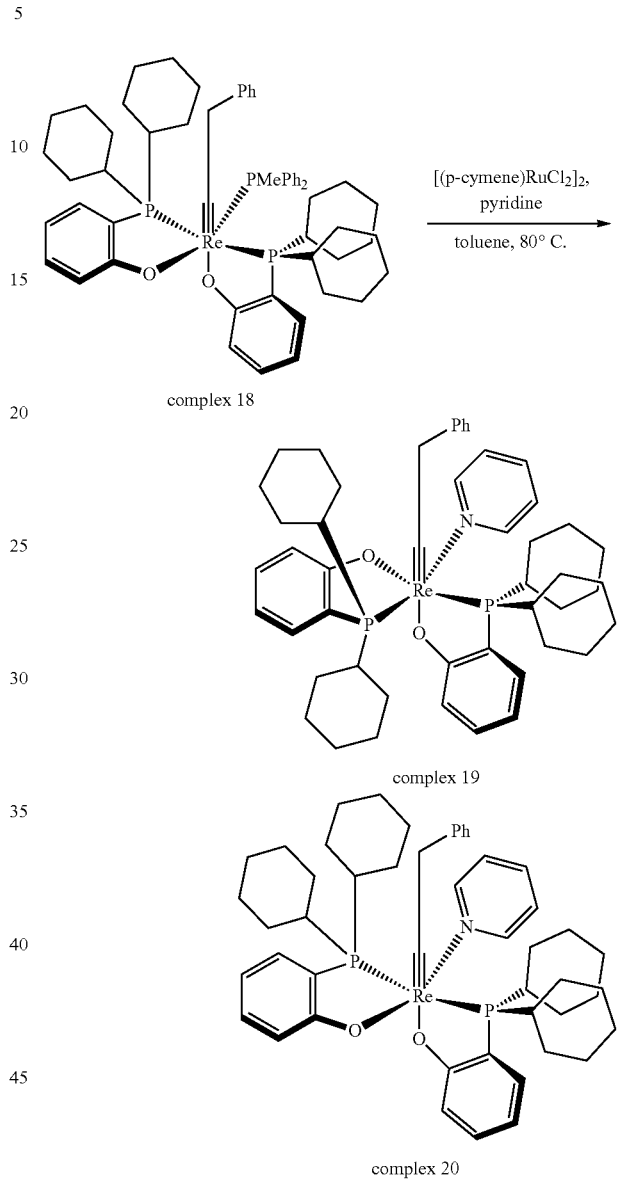

complex 18

A mixture of Re(≡CCH$_2$Ph)Cl$_2$(PMePh$_2$)$_3$ (800 mg, 0.83 mmol), 2-(dicyclohexylphosphino)phenol (656 mg, 2.26 mmol) and Et$_3$N (42 mg, ca. 0.58 mL, 4.16 mmol) in 16 mL of toluene was heated at 100° C. for 4 hours. After cooling down to room temperature, the solution was filtered to remove triethylamine hydrochloride. The filtrate was evaporated under vacuum to give an orange oily residue, which was washed with hexane (5 mL×2), methanol (3 mL×3) and acetonitrile (3 mL×3) to give the desired product as a yellow solid. Yield: 683 mg, 77%.

$^1$H NMR (400 MHz, CDCl$_3$) δ 7.64-7.49 (m, 4H), 7.39-7.20 (m, 7H), 7.20-7.03 (m, 3H), 6.96 (t, J=7.1 Hz, 1H), 6.87 (t, J=7.4 Hz, 2H), 6.82-6.71 (m, 3H), 6.64 (dd, J=7.8, 4.4 Hz, 1H), 6.46 (dd, J=14.7, 7.4 Hz, 2H), 3.33 (d, J=19.3 Hz, 1H), 3.15 (d, J=20.1 Hz, 1H), 3.01 (dd, J=21.4, 10.1 Hz, 1H), 2.83 (br s, 1H), 2.35 (dd, J=23.4, 11.5 Hz, 1H), 2.24-2.11 (m, 4H), 2.03 (br s, 1H), 1.80-0.79 (m, 38H), 0.43 (dd, J=24.5, 12.3 Hz, 1H). $^{13}$C{$^1$H} NMR (101 MHz, CDCl$_3$) δ 270.18 (q, J=12.1 Hz), 180.98 (dd, J=18.4, 5.5 Hz), 176.04 (dd, J=22.3, 5.4 Hz), 144.48 (s), 144.08 (s), 142.68 (s), 135.72 (s), 142.30 (s), 133.70 (s), 133.67 (s), 131.90-131.54 (m), 131.02 (s), 129.33-127.95 (m), 125.75 (s), 120.62 (d, J=5.9 Hz), 119.23 (s), 118.81 (s), 118.63 (d, J=6.2 Hz), 114.09 (d, J=5.7 Hz), 113.39 (d, J=5.0 Hz), 58.08 (s), 40.95 (d, J=22.9 Hz), 35.96 (dd, J=16.8, 4.6 Hz), 33.73-32.62 (m), 30.86 (d, J=6.1 Hz), 30.33 (d, J=8.0 Hz), 28.88-27.40 (m), 27.37-26.24 (m), 19.65 (s), 19.33 (s). $^{31}$P{$^1$H} NMR (162 MHz, CDCl$_3$) δ 36.70 (dd, J=189.3, 5.9 Hz), 28.88 (d, J=189.1 Hz), −10.66 (s). Elem. Anal. Calcd for C$_{57}$H$_{72}$O$_2$P$_3$Re0.5(C$_6$H$_{14}$): C, 64.84; H, 7.16. Found: C, 64.85; H, 7.07.

Example 18—Synthesis of Cis-Re(≡CCH$_2$pH)($^{Cy}$PO)$_2$(Py) (Complex 19) and Trans-Re(≡CCH$_2$pH)($^{Cy}$PO)$_2$(Py) (Complex 20)

A mixture of Re(≡CCH$_2$Ph)($^{Cy}$PO)$_2$(PMePh$_2$) (complex 18, 200 mg, 0.19 mmol), [(p-cymene)RuCl$_2$]$_2$ (60 mg, 0.098 mmol) and pyridine (150 mg, ca. 0.15 mL, 1.90 mmol) in 5 mL of toluene was heated at 80° C. for 2 hours. After the reaction, the mixture was cooled down to room temperature and volatiles were removed under vacuum to give an orange residue. The residue was extracted with cyclohexane (5 mL×4), leaving (p-cymene)RuCl$_2$(PMePh$_2$) as the remaining pale orange residue. The cyclohexane extracts were combined and evaporated under vacuum to give a reddish orange solid. The solid was dissolved with toluene (2 mL), which was evaporated under vacuum again to completely remove remaining cyclohexane to give complexes 19 and 20 as a mixture of cis and trans isomers (molecular ratio=9:1). Yield: 169 mg, 89%.

$^1$H NMR (400 MHz, C$_6$D$_6$) δ 9.00 (d, J=4.8 Hz, 2H), 7.62 (d, J=7.5 Hz, 2H), 7.34-6.89 (m, 9H), 6.69 (t, J=6.1 Hz, 1H), 6.59 (t, J=6.5 Hz, 2H), 6.28 (t, J=6.3 Hz, 2H), 3.85 (d, J=20.3 Hz, 1H), 3.58 (d, J=19.5 Hz, 1H), 2.64–0.86 (m, 42H), 0.84–0.69 (m, 1H), 0.24–0.07 (m, 1H). $^{13}$C{$^{1}$H} NMR (101 MHz, C$_6$D$_6$) δ 263.52 (t, J=14.1 Hz, Re 180.45 (d, J=16.7 Hz), 174.88 (d, J=20.5 Hz), 158.69 (s), 158.42 (s), 154.00 (s), 136.66 (s), 135.59 (s), 132.68 (s), 131.95 (s), 131.78 (s), 131.59 (s), 128.98 (s), 128.91 (s), 126.67 (s), 124.00 (s), 121.97 (d, J=5.7 Hz), 120.70 (s), 120.46 (s), 120.24 (s), 120.03 (s), 115.45 (d, J=5.6 Hz), 114.25 (d, J=4.9 Hz), 56.81 (s, Re≡CCH$_2$Ph), 50.01 (d, J=30.2 Hz), 41.61 (d, J=25.8 Hz), 38.70 (d, J=28.3 Hz), 38.35 (d, J=23.5 Hz), 32.51–25.83 (m). $^{31}$P{$^{1}$H} NMR (162 MHz, CDCl$_3$) δ 37.52, 30.94. Anal. Calcd for C$_{49}$H$_{64}$NO$_2$P$_2$Re: C, 62.13; H, 6.81; N, 1.48. Found: C, 61.55; H, 6.94; N, 1.23.

Example 19—Catalytic Alkyne Metathesis Reaction in Dry Toluene

Example 19A: Alkyne Homo-Metathesis (General Procedure A)

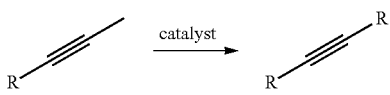

250 mg of 5 Å MS in a Schlenk tube was activated with a 450° C. hot drying gun under vacuum. After cooling down to room temperature, the Schlenk tube was recharged with N$_2$. 0.004-0.006 mmol of complex 14 (2-3 mol %), 0.2 mmol of alkyne and 2 mL of dry toluene were added and the mixture was stirred at 100° C. for 8-16 hours. After the reaction, the mixture was filtered through Celite in air to remove MS and the filter cake was further washed with DCM. Then, the crude products were combined and purified by flash silica gel column chromatography to obtain the pure product.

Example 19B—Alkyne Cross-Metathesis

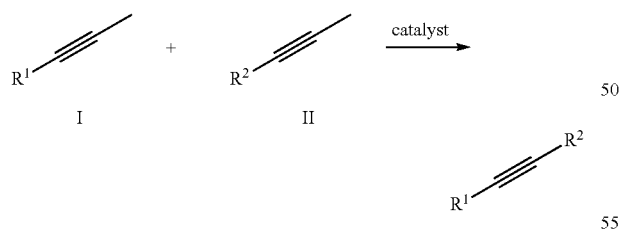

250 mg of 5 Å MS in a Schlenk tube was activated with a 450° C. hot drying gun under vacuum. After cooling down to room temperature, the Schlenk tube was recharged with N$_2$. 0.004-0.006 mmol of complex 13 (2-3 mol %), 0.2 mmol of alkyne I, 0.4 mmol of alkyne II and 2 mL of dry toluene were added and the mixture was stirred at 100° C. for 12-24 hours. After the reaction, the mixture was filtered through Celite in air to remove MS and the filter cake was further washed with DCM. Then, the crude products were combined and purified by flash silica gel column chromatography to obtain the pure product.

Example 19C—Alkyne Cross-Metathesis

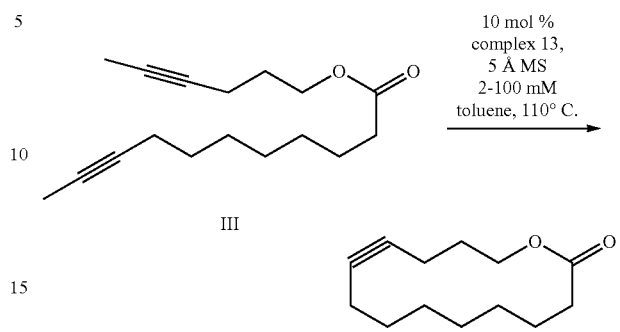

600 mg of 5 Å MS in a Schlenk tube was activated with a 450° C. hot drying gun under vacuum. After cooling down to room temperature, the Schlenk tube was recharged with N$_2$. 0.01 mmol of complex 13 (10 mol %), 0.1 mmol of alkyne III and 20 mL of dry toluene were added and the mixture was stirred at 110° C. for 12-24 hours. After the reaction, the mixture was filtered through Celite in air to remove MS and the filter cake was further washed with DCM. Then, the crude products were combined and purified by flash silica gel column chromatography to obtain the pure product.

Example 20—Catalytic Alkyne Metathesis Reactions in Wet Toluene

Example 20A: Alkyne Homo-Metathesis (General Procedure B)

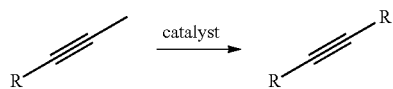

In a long test tube, a mixture of 0.004-0.006 mmol of complex 14 (2-3 mol %), 0.2 mmol of alkyne and 2 mL of wet toluene was bubbled with N$_2$ (g) for 10 minutes. The test tube was then capped and attached to an oil bubbler. The reaction mixture was gently refluxed for 48 hours. After the reaction, the volatiles were removed by a rotary evaporator, and purified by flash silica gel column chromatography to get the pure product.

Example 20B—Ring-Opening Alkyne Metathesis Polymerization

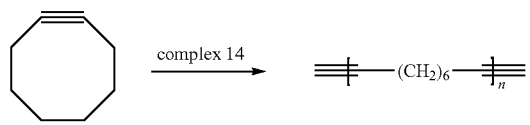

A mixture of 0.002 mmol of complex 14 (1 mol %), 0.2 mmol of cyclic alkyne and 2 mL of toluene was bubbled with N$_2$ (g) for 10 minutes. The reaction mixture was heated at 80° C. for 3 hours. After the reaction, addition of methanol precipitates the pure product.

Example 21—Exemplary Homo-Metathesis Products 4,4'-Dimethylphenylacetylene

Synthesized following general procedure A. p-Tolyl-1-propyne (26.0 mg, 0.2 mmol), catalyst Complex 14 (5.9 mg, 2 mol %), 5 Å MS (250 mg), dry toluene (2 mL, 0.1 M), 100° C., 8 h. Purified by flash column chromatography (hexane). White crystals. Yield: 19.1 mg, 93%. $^1$H NMR (400.1 MHz, CDCl$_3$) δ 7.43 (d, J=8.1 Hz, 4H), 7.16 (d, J=7.9 Hz, 4H), 2.38 (s, 6H).

4,4'-Dichlorophenylacetylene

Synthesized following general procedure A. 4-Chlorophenyl propyne (33.1 mg, 0.2 mmol), catalyst Complex 14 (5.9 mg, 2 mol %), 5 Å MS (250 mg), dry toluene (2 mL, 0.1 M), 100° C., 8 h. Purified by flash column chromatography (hexane). White solid. Yield: 21.9 mg, 89%. $^1$H NMR (400.1 MHz, CDCl$_3$) δ 7.45 (d, J=8.5 Hz, 4H), 7.33 (d, J=8.5 Hz, 4H).

4,4'-Dimethoxyphenylacetylene

Synthesized following general procedure A. 4-Methoxyphenyl propyne (33.1 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane to hexane:EA=50:1). White solid. Yield: 19.8 mg, 83%. 1H NMR (400.1 MHz, CDCl$_3$) δ 7.51–7.39 (m, 4H), 6.93–6.80 (m, 4H), 3.82 (s, 6H).

4,4'-Diacetylphenylacetylene

Synthesized following general procedure A. 4-Acetylphenyl propyne (31.6 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane:EA=50:1 to 10:1). White solid. Yield: 23.7 mg, 90%. 1H NMR (400.1 MHz, CDCl$_3$) δ 7.96 (d, J=8.4 Hz, 4H), 7.63 (d, J=8.4 Hz, 4H), 2.62 (s, 6H).

4,4'-Ditrifluoromethylphenylacetylene

Synthesized following general procedure A. 4-Trifluoromethylphenyl propyne (36.8 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane). White solid. Yield: 21.5 mg, 68%. $^1$H NMR (400.1 MHz, CDCl$_3$) δ 7.69–7.58 (m, 8H).

4,4'-Bis(methoxycarbonyl)diphenylacetylene

Synthesized following general procedure A. 4-Propynyl benzoic acid methyl ester (36.8 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane:EA=40:1 to 10:1). White solid. Yield: 24.8 mg, 84%. $^1$H NMR (400.1 MHz, CDCl$_3$) δ 8.03 (d, J=8.5 Hz, 4H), 7.59 (d, J=8.5 Hz, 4H), 3.92 (s, 6H).

4,4'-Bis(N,N-dimethylaminophenyl)acetylene

Synthesized following general procedure A. 4-N,N-Dimethylaminophenyl propyne (31.8 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane:EA:Et3N=100:5:1). White solid. Yield: 21.5 mg, 81%. $^1$H NMR (400.1 MHz, CDCl$_3$) δ 7.39 (d, J=8.9 Hz, 4H), 6.66 (d, J=8.9 Hz, 4H), 2.98 (s, 12H).

2,2'-Dithiophenylacetylene

Synthesized following general procedure A. 2-Thienyl propyne (24.4 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane:DCM=100:1). White crystals. Yield: 17.3 mg, 91%. $^1$H NMR (400.1 MHz, CDCl$_3$) δ 7.37–7.25 (m, 4H), 7.01 (dd, J=5.1, 3.7 Hz, 2H).

4,4'-(Ethyne-1,2-diyl)dibenzaldehyde

Synthesized following general procedure A. 4-Propynylbenzaldehyde (28.8 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane:DCM=10:1 to DCM). White solid. Yield: 22.3 mg, 95%. $^1$H NMR (400.1 MHz, CDCl$_3$) δ 10.04 (s, 2H), 7.90 (d, J=8.0 Hz, 4H), 7.71 (d, J=8.0 Hz, 4H).

4,4'-Dihydroxyphenylacetylene

Synthesized following general procedure A. 4-Hydroxyphenyl propyne (26.4 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane:EA=3:1). White solid. Yield: 15.2 mg, 72%. $^1$H NMR (400.1 MHz, CD3CN) δ 7.34 (d, J=8.7 Hz, 4H), 6.88–6.74 (m, 4H), 2.34 (br, 2H).

4,4'-Dianilinoacetylene

Synthesized following general procedure B. 4-Anilino propyne (26.2 mg, 0.2 mmol), catalyst Complex 14 (8.8 mg, 3 mol %), degassed wet toluene (2 mL, 0.1 M), reflux, 48 h. Purified by flash column chromatography (hexane:EA=2:1). White solid. Yield: 15.2 mg, 73%. $^1$H NMR (400.1 MHz, CDCl$_3$) δ 7.33–7.27 (m, 4H), 6.65–6.58 (m, 4H), 3.81 (br, 4H).

1,6-Dibenzyloxy-3-hexyne

Synthesized following general procedure A. 1-Benzyloxy-3-pentyne (34.8 mg, 0.2 mmol), catalyst Complex 14 (5.9 mg, 2 mol %), 5 Å MS (250 mg), dry toluene (2 mL, 0.1 M), 100° C., 8 h. Purified by flash column chromatography (hexane:EA=20:1 to 10:1). White solid. Yield: 24.9 mg, 85%. $^1$H NMR (400.1 MHz, CDCl$_3$) δ 7.41–7.23 (m, 10H), 4.56 (s, 4H), 3.57 (t, J=7.0 Hz, 4H), 2.58–2.39 (m, 4H).

1,4-Dibenzyloxy-2-butyne

Synthesized following general procedure A. 1-Benzyloxy-2-butyne (32.0 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (hexane:EA=30:1 to 20:1). White solid. Yield: 14.3 mg, 54%. 1H NMR (400.1 MHz, CDCl$_3$) δ 7.41–7.27 (m, 10H), 4.62 (s, 4H), 4.25 (s, 4H).

9-Octadecyne-1,18-diol

Synthesized following general procedure A. Undec-9-yn-1-ol (33.7 mg, 0.2 mmol), catalyst Complex 14 (8.8 mg, 3 mol %), 5 Å MS (250 mg), dry toluene (2 mL, 0.1 M), 100° C., 16 h. Purified by flash column chromatography (DCM to DCM:MeOH=10:1). White solid. Yield: 25.0 mg, 88%. $^1$H NMR (400.1 MHz, CDCl$_3$) δ 3.62 (t, J=6.7 Hz, 4H), 2.24–2.03 (m, 4H), 1.73 (br, 2H), 1.56 (dt, J=13.5, 6.7 Hz, 4H), 1.50–1.42 (m, 4H), 1.42–1.24 (m, 16H). $^{13}$C{$^1$H} NMR (100.6 MHz, CDCl$_3$) δ 80.38, 63.14, 32.89, 29.47, 29.25, 29.22, 28.88, 25.82, 18.86. HRMS (CI) calcd. for $[C_{18}H_{35}O_2]^+$ $[M+H]^+$: 283.2632; found: 283.2650.

8-Hexadecyne-1,16-dicarboxylic acid

Synthesized following general procedure A. 9-Undecynoic acid (36.5 mg, 0.2 mmol), catalyst Complex 14 (8.8 mg, 3 mol %), 5 Å MS (250 mg), dry toluene (2 mL). Purified by flash column chromatography (DCM:HCOOH=100:1 to DCM:EA:HCOOH=100:10:1). White solid. Yield: 21.7 mg, 70%.

Synthesized following general procedure B. 9-Undecynoic acid (36.5 mg, 0.2 mmol), catalyst Complex 14 (8.8 mg, 3 mol %), degassed wet toluene (2 mL, 0.1 M), reflux, 48 h.

Purified by flash column chromatography (DCM: HCOOH=100:1 to DCM:EA:HCOOH=100:10:1). White solid. Yield: 24.4 mg, 79%.

$^1$H NMR (400.1 MHz, CDCl$_3$) δ 2.35 (t, J=7.1 Hz, 4H), 2.13 (t, J=6.6 Hz, 4H), 1.73– 1.59 (m, 4H), 1.53– 1.26 (m, 16H). $^{13}$C{$^1$H} NMR (100.6 MHz, CDCl3) δ 180.38, 80.38, 34.26, 29.06, 28.98, 28.88, 28.71, 24.88, 18.85. HRMS (CI) calcd. for [C$_{18}$H$_{31}$O$_4$]+[M+H]$^+$: 311.2217; found: 311.2238.

What is claimed is:

1. A rhenium(V) alkylidyne complex of Formula 1:

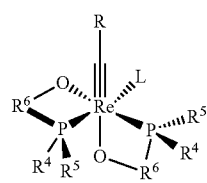

wherein L is pyridine, 4-(trifluoromethyl)pyridine, nitrile, or PR$^1$R$^2$R$^3$, wherein each of R$^1$, R$^2$, and R$^3$ is independently selected from the group consisting of alkyl and aryl;

R is alkyl, phenyl, 2-thiophene, or CH$_2$Ar$^1$, wherein Ar$^1$ is phenyl or o-bromophenyl;

each of R$^4$ and R$^5$ is independently phenyl optionally substituted with alkyl, CH$_3$, OCH$_3$, F or CF$_3$; and R$^6$ for each instance is independently a moiety selected from the group consisting of

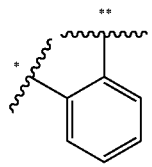 and 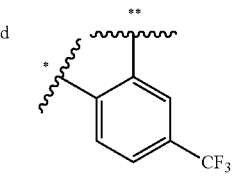

wherein * represents the site of the covalent bond to oxygen and ** represent the site of the covalent bond to phosphorous.

2. The rhenium(V) alkylidyne complex of claim 1, wherein L is pyridine, PMePh$_2$, or PMe$_2$Ph.

3. The rhenium(V) alkylidyne complex of claim 1, wherein R is CH$_2$Ar$^1$, wherein Ar$^1$ is phenyl or o-bromophenyl.

4. Cancelled) The rhenium(V) alkylidyne complex of claim 1, wherein each of R$^4$ and R$^5$ is independently alkyl, cycloalkyl, or phenyl optionally substituted with one or more substituents selected from alkyl, CH$_3$, OCH$_3$, F, and CF$_3$.

5. The rhenium(V) alkylidyne complex of claim 1, wherein each of R$^4$ and R$^5$ is phenyl, 4-fluorophenyl, 2,4-difluorophenyl, 4-trifluoromethylphenyl, 2,4-bis(trifluoromethyl)phenyl, 2,4-dimethylphenyl, 4-methoxyphenyl, or 2,4-dimethoxyphenyl.

6. The rhenium(V) alkylidyne complex of claim 1, wherein the rhenium(V) alkylidyne complex is selected from the group consisting of:

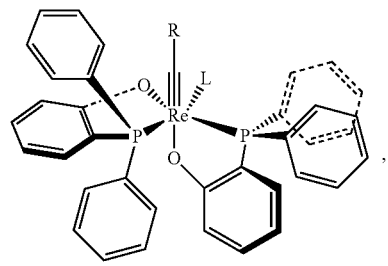

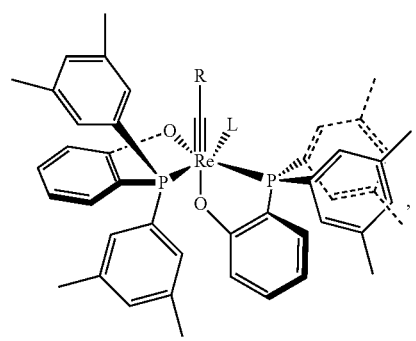

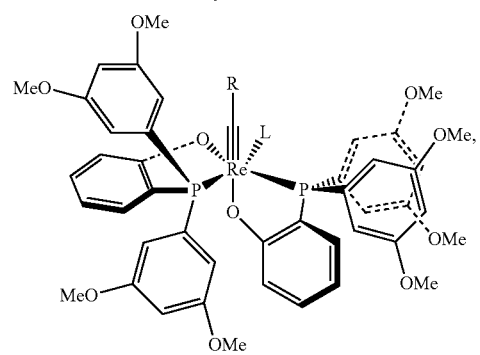

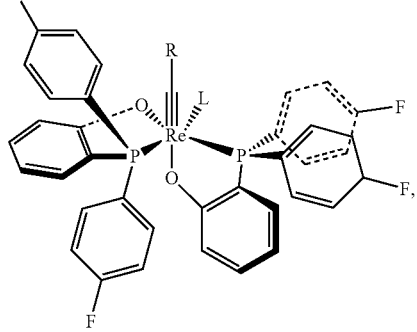

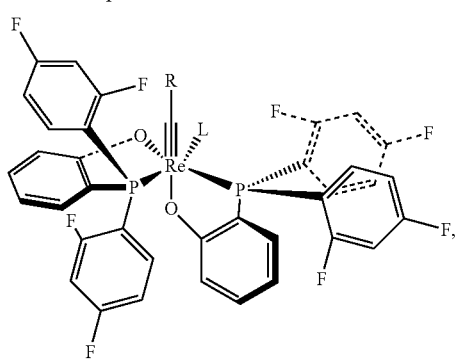

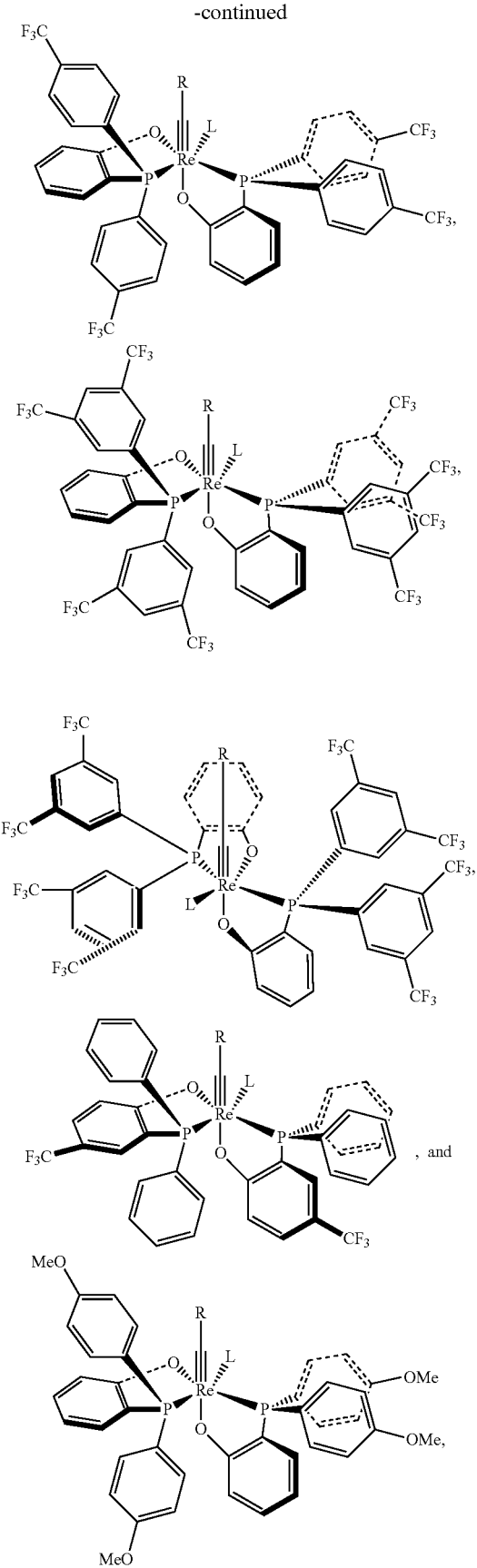

-continued wherein R is alkyl, phenyl, 2-thiophene, or $CH_2Ar^1$, wherein $Ar^1$ is phenyl or o-bromophenyl; and L is pyridine, 4-(trifluoromethyl)pyridine, $PMePb_2$, or $PMe_2Ph$.

7. The rhenium(V) alkylidyne complex of claim 6, wherein R is $CH_2Ph$.

8. The rhenium(V) alkylidyne complex of claim 7, wherein L is pyridine.

9. The rhenium(V) alkylidyne complex of claim 1, wherein the rhenium(V) alkylidyne complex has the structure:

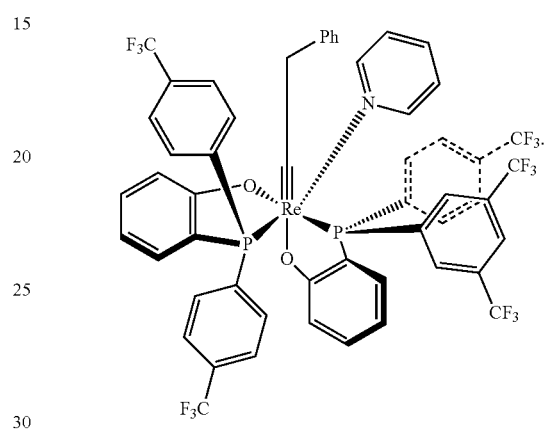

10. A method of preparing the rhenium (V) alkylidyne complex of claim 1, the method comprising: contacting a compound of Formula 6:

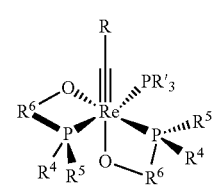

6 wherein R is alkyl, phenyl, 2-thiophene, or $CH_2Ar^1$, wherein $Ar^1$ is phenyl or o-bromophenyl;

$PR'_3$ is $PMePh_2$ or $PMe_2Ph$;

each of $R^4$ and $R^5$ is independently phenyl optionally substituted with alkyl $CH_3$, $OCH_3$, F, or $CF_3$; and $R^6$ for each instance is independently a moiety selected from the group consisting of:

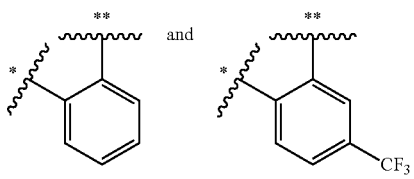 [SMILES: *c1ccccc1* ; *c1ccc(C(F)(F)F)cc1*]

wherein * represents the site of the covalent bond to oxygen and ** represent the site of the covalent bond to phosphorous;

with a compound of Formula 7:
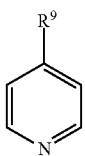
wherein R⁹ is hydrogen or $CF_3$; and a phosphine scavenger selected from CuCl or CuI; thereby forming the rhenium (V) alkylidyne complex of claim 1.
11. The method of claim 10, wherein the rhenium (V) alkylidyne complex is selected from the group consisting of:
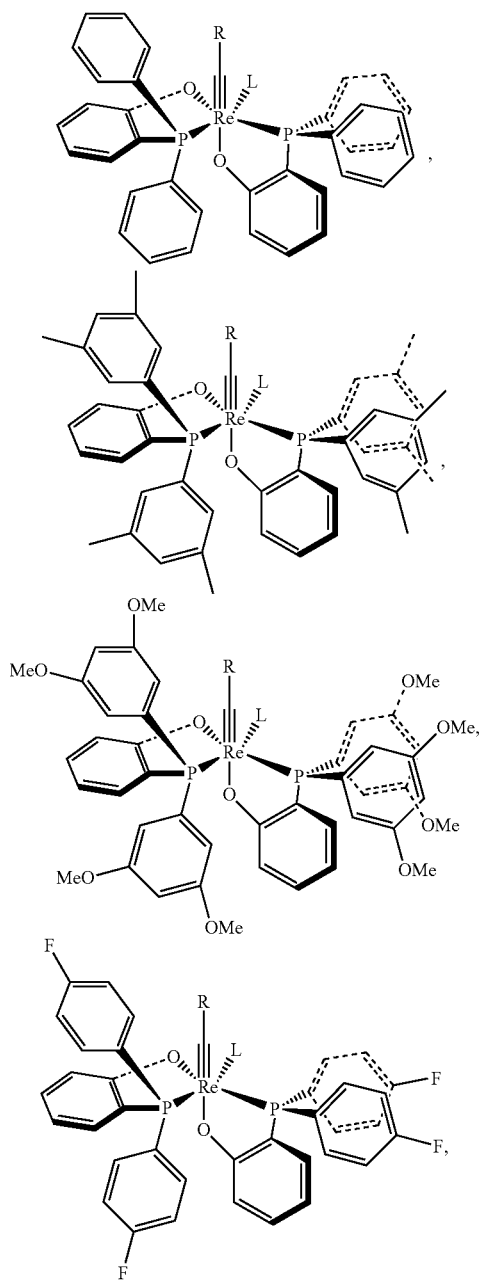
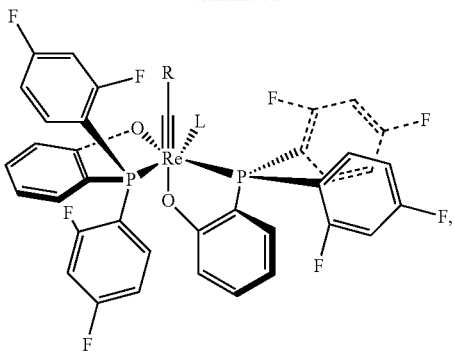
-continued
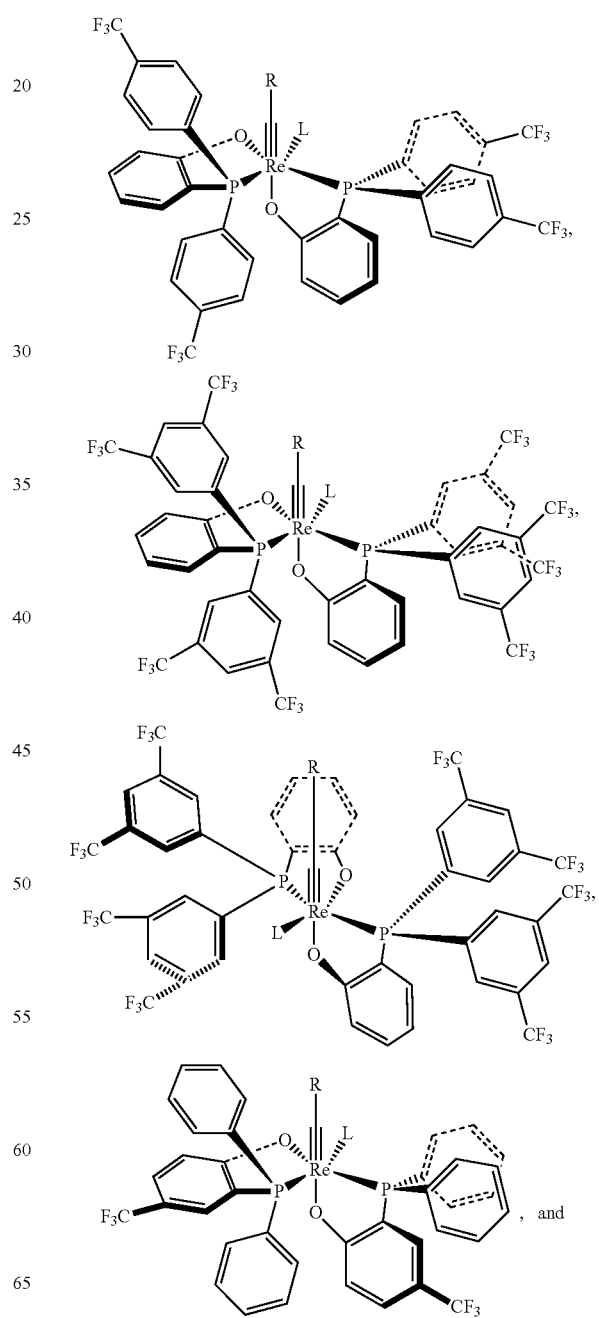

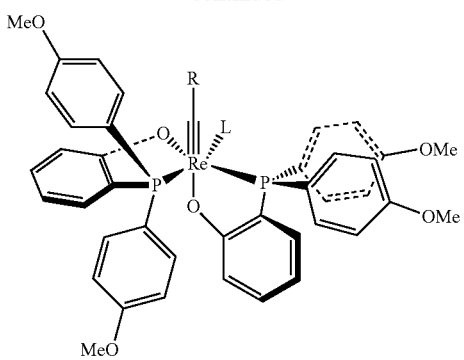

wherein R is CH₂Ph; and L is pyridine.

12. The method of claim 10 further comprising the step of contacting a compound of Formula 8:

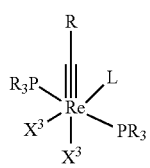

wherein $X^3$ is Cl; PR; is PMePh₂ or PMe₂Ph; R is alkyl, phenyl, 2-thiophene, or CH₂Ar¹, wherein Ar¹ is phenyl or o-bromophenyl; with a compound of Formula 9:

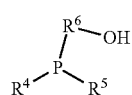

wherein each of $R^4$ and $R^3$ is independently phenyl optionally substituted with alkyl, CH₃, OCH₃, F, or CF₃; and $R^6$ is a moiety selected from the group consisting of:

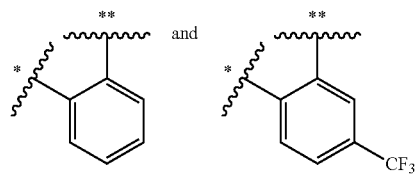 [SMILES: *c1ccccc1* ; *c1ccc(C(F)(F)F)cc1*]

wherein * represent the site of the covalent bond to oxygen and ** represents the site of the covalent bond to phosphorous thereby forming the compound of Formula 6.

13. The method of claim 12, wherein the compound of Formula 8 has the structure:

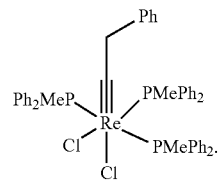

14. The method of claim 12, wherein the compound of Formula 9 is selected from the group consisting of: (2-hydroxyphenyl)diphenylphosphine, 2-bis(3,5-dimethyl phenyl)phosphinophenol, 2-[bis(4-methoxy phenyl)phosphino]phenol, [2-bis(4-fluorophenyl)phosphino]phenol, (2-hydroxyphenyl)-bis(2,4-difluorophenyl)phosphine, ), 2-{bis[4-(trifluoromethyl)phenyl]phosphino]}phenol, 2-{bis[3,5-bis(trifluoromethyl)phenyl]phosphino}phenol, and (2-hydroxy-5-trifluoromethylphenyl)diphenylphosphine.

15. A method for performing a metathesis reaction, the method comprising: contacting a rhenium(V) alkylidyne complex of claim 1 with at least one alkyne substrate thereby forming an alkyne metathesis product.

16. The method of claim 15, wherein the metathesis reaction is an alkyne homo-metathesis reaction, alkyne cross-metathesis, ring closing alkyne metathesis, ring opening alkyne metathesis polymerization, acyclic diyne metathesis polymerization, or acyclic diyne metathesis macrocyclozation.

17. The method of claim 15, wherein the alkylidyne complex is selected from the group consisting of:

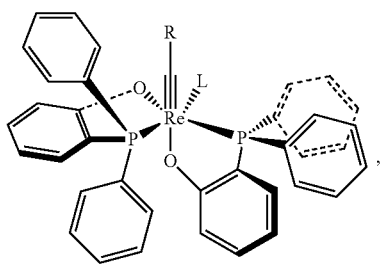

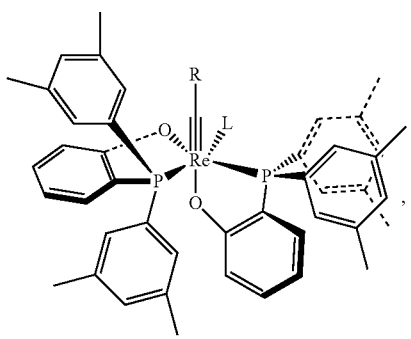

-continued
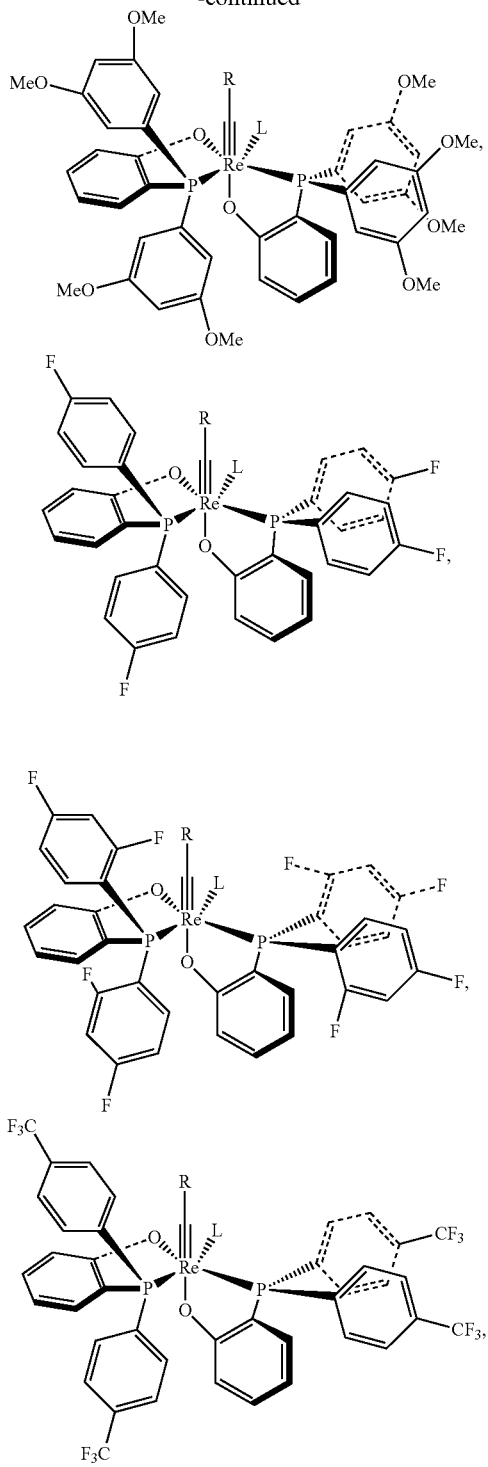
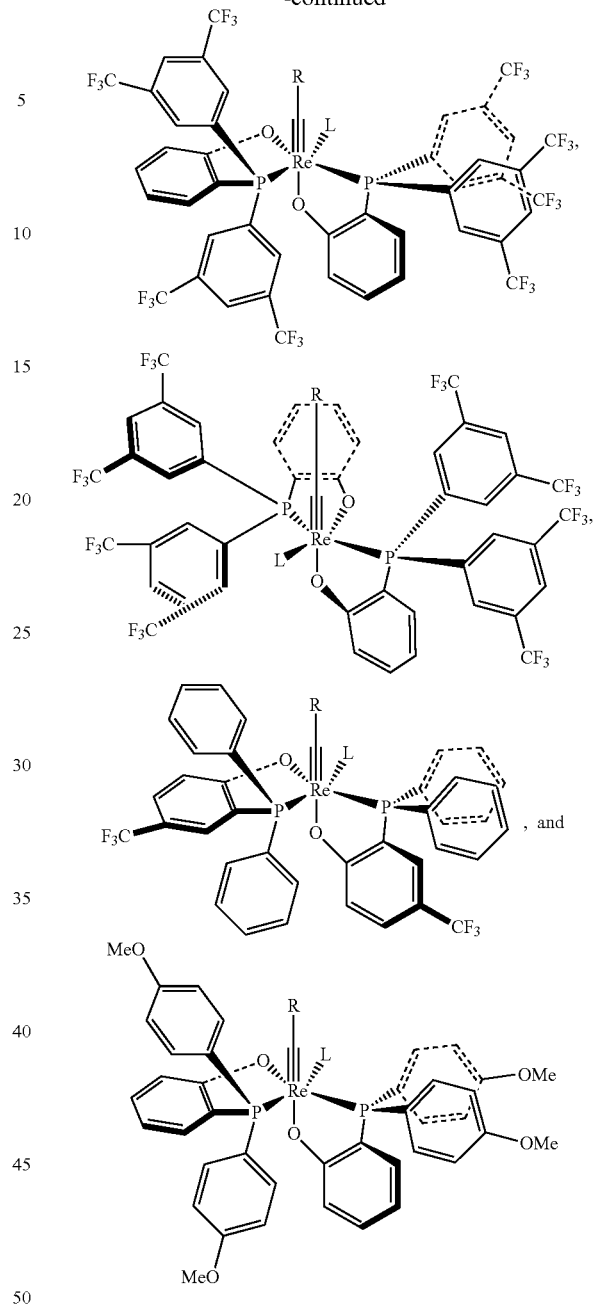
wherein R is CH$_2$Ph; and L is pyridine.
18. The method of claim 15, wherein the at least one alkyne substrate is selected from the group consisting of an acyclic alkyne, a cyclic alkyne, an acyclic diyne, and a cyclic diyne.
* * * * *